(12) United States Patent
Dembele-Kuntzmann et al.

(10) Patent No.: US 12,539,261 B2
(45) Date of Patent: Feb. 3, 2026

(54) ENCAPSULATED COMPOSITIONS

(71) Applicant: GIVAUDAN SA, Vernier (CH)

(72) Inventors: Fatimata Dembele-Kuntzmann, Argenteuil (FR); Marion Coureault, Argenteuil (FR)

(73) Assignee: GIVAUDAN SA, Vernier (CH)

( * ) Notice: Subject to any disclaimer, the term of this patent is extended or adjusted under 35 U.S.C. 154(b) by 0 days.

(21) Appl. No.: 18/842,208

(22) PCT Filed: Mar. 7, 2023

(86) PCT No.: PCT/EP2023/055804
§ 371 (c)(1),
(2) Date: Aug. 28, 2024

(87) PCT Pub. No.: WO2023/170102
PCT Pub. Date: Sep. 14, 2023

(65) Prior Publication Data
US 2025/0099347 A1 Mar. 27, 2025

(30) Foreign Application Priority Data

Mar. 8, 2022 (GB) ..................................... 2203193

(51) Int. Cl.
| | | |
|---|---|---|
| *A01N 25/28* | (2006.01) | |
| *A61K 8/11* | (2006.01) | |
| *A61K 8/58* | (2006.01) | |
| *A61K 8/87* | (2006.01) | |
| *A61K 9/48* | (2006.01) | |
| *A61Q 19/00* | (2006.01) | |

(52) U.S. Cl.
CPC ................ *A61K 8/11* (2013.01); *A61K 8/585* (2013.01); *A61K 8/87* (2013.01); *A61Q 19/00* (2013.01); *A61K 2800/10* (2013.01)

(58) Field of Classification Search
None
See application file for complete search history.

(56) References Cited

U.S. PATENT DOCUMENTS

| | | | |
|---|---|---|---|
| 11,571,674 B1 * | 2/2023 | Dihora ..................... | B01J 13/16 |
| 2017/0360676 A1 * | 12/2017 | Dihora ................. | C11D 3/3723 |
| 2021/0237018 A1 * | 8/2021 | Bachawala .......... | C08G 18/003 |
| 2022/0151902 A1 * | 5/2022 | Denigot ................. | A61Q 13/00 |

FOREIGN PATENT DOCUMENTS

| | | |
|---|---|---|
| WO | 2018109469 A1 | 6/2018 |
| WO | 2020207849 A1 | 10/2020 |
| WO | 2020233887 A1 | 11/2020 |
| WO | 2022023110 A1 | 2/2022 |

OTHER PUBLICATIONS

Great Britain Search Report for Application No. GB2203193.4, dated Aug. 25, 2022.
International Search Report for PCT Application No. PCT/EP2023/055804, dated May 25, 2023.
International Written Opinion for PCT Application No. PCT/EP2023/055804, dated May 25, 2023.

* cited by examiner

*Primary Examiner* — Brian Gulledge
(74) *Attorney, Agent, or Firm* — Curatolo Sidoti & Trillis Co., LPA; Floyd Trillis, III; Salvatore A. Sidoti

(57) ABSTRACT

The present invention provides an encapsulated composition comprising at least one core-shell microcapsule, wherein the at least one core-shell microcapsule comprises a core comprising at least one benefit agent and a shell surrounding the core, wherein the shell comprises:
  a) a polymeric stabilizer that is formed by combination of a bio-based polymeric surfactant with at least one aminosilane;
  b) a bio-based and biodegradable hydrocolloid; and
  c) a linker derived from a bio-based and biodegradable epoxy resin.

The invention also provides a method for preparing the encapsulated composition, a consumer product comprising the encapsulated composition and the use of the encapsulated composition to improve the perception or enhance the performance of the benefit agent in a consumer product.

17 Claims, No Drawings

ENCAPSULATED COMPOSITIONS

CROSS REFERENCE TO RELATED APPLICATIONS

This application is a national stage application of International Application No. PCT/EP2023/055804, filed 7 Mar. 2023, which claims priority from Great Britain Patent Application No 2203193.4, filed 8 Mar. 2022, both of which applications are incorporated herein by reference.

The present invention relates to an encapsulated composition comprising at least one core-shell microcapsule, in particular to an encapsulated composition wherein the shell comprises a polymeric stabilizer that is formed by combination of a bio-based polymeric surfactant with at least one aminosilane, a bio-based and biodegradable hydrocollolid and a linker derived from a bio-based and biodegradable epoxy resin. The invention also relates to a method for preparing encapsulated compositions as described herein. The invention is also concerned with a consumer product comprising an encapsulated composition as described herein and to the use of an encapsulated composition to improve the perception or enhance the performance of the benefit agent in a consumer product.

It is known to incorporate encapsulated benefit agents in consumer products, such as household care, personal care, fabric care and pet care products. Benefit agents include for example fragrances, cosmetic agents, food ingredients, nutraceuticals, drugs and substrate enhancers.

Microcapsules that are particularly suitable for delivery of such benefit agents are core-shell microcapsules, wherein the core usually comprises the benefit agent and the shell is impervious or partially impervious to the benefit agent. Generally, these microcapsules are employed in aqueous media and the encapsulated benefit agents are hydrophobic. A broad selection of shell materials can be used, provided the shell material is impervious or partially impervious to the encapsulated benefit agent.

Benefit agents are encapsulated for a variety of reasons. Microcapsules can isolate and protect such materials from external suspending media, such as consumer product bases, in which they may be incompatible or unstable. They are also used to assist in the deposition of benefit agents onto substrates, such as skin or hair, fabrics or hard household surfaces in case of perfume ingredients. They can also act as a means of controlling the spatio-temporal release of a benefit agent.

In order for microcapsules to be suitable for various applications it is necessary that they are sufficiently robust (i.e. sufficiently stable and not leaky during manufacture and storage), while at the same time enabling an acceptable release profile of the core contents, as desired in each application.

In addition, consumers are increasingly concerned about using materials obtained from non-renewable sources, such as synthetic petrochemicals, as well as about the processes for manufacturing the consumer products. The "clean label" concept is one of the biggest trends of the decade. The term itself has many definitions including sustainable, naturally sourced and biodegradable ingredients as well as minimal processing and impact on the environment. Nevertheless, it is generally difficult to use natural materials or materials derived from nature to satisfy the requirements for suitable encapsulation compositions. Bio-based and biodegradable ingredients for customer formulations must provide a unique combination of performance and sustainability, so consumers feel confident in the safety and efficacy of these ingredients.

WO2020/233887 A1 discloses an encapsulated composition comprising core-shell microcapsules, wherein the shell comprises a polymeric stabilizer that is formed by combination of pectin with bis(3-(triethoxysilyl)propyl)amine, and wherein the shell additionally comprises hydroxyethyl cellulose (HEC). Although both pectin and HEC are bio-based polymers produced from renewable resources, it would be desirable to improve the capability of the microcapsules for biodegradation.

Therefore, there is still a need to provide encapsulated compositions that are sustainable and comprise increased levels of natural materials with good predicted biodegradability, whilst satisfying the required balance between robustness and benefit-agent release properties, during all stages of manufacture, storage and use. Furthermore, the processes of manufacturing the compositions should follow the "clean label" requirements, in addition to being safe, robust and cost-efficient.

SUMMARY OF THE INVENTION

In a first aspect, the invention provides an encapsulated composition comprising at least one core-shell microcapsule, wherein the at least one core-shell microcapsule comprises a core comprising at least one benefit agent and a shell surrounding the core, wherein the shell comprises:
 a) a polymeric stabilizer that is formed by combination of a bio-based polymeric surfactant with at least one aminosilane;
 b) a bio-based and biodegradable hydrocollolid; and
 c) a linker derived from a bio-based and biodegradable epoxy resin.

In a further aspect, the invention provides methods for preparing an encapsulated composition as defined hereinbefore.

In another aspect, it is provided a consumer product comprising an encapsulated composition as defined hereinbefore.

The invention further provides use of an encapsulated composition as defined hereinbefore to improve the perception or enhance the performance of the benefit agent in a consumer product.

Definitions

The term "benefit agent" refers to any substance which, when added to a product, may improve the perception of this product by a consumer or may enhance the action of this product in an application. Examples of benefit agents include perfume ingredients, flavor ingredients, cosmetic ingredients, bioactive agents (such as bactericides, insect repellents and pheromones), substrate enhancers (such as silicones and brighteners), enzymes (such as lipases and proteases), dyes, pigments and nutraceuticals.

The term "bio-based" relates to the origin of a material and refers to materials intentionally made from substances derived from living (or once-living) organisms, as opposed to petroleum-derived materials. The definition includes both natural materials, such as naturally-extracted proteins and polysaccharides, and materials that have undergone some degree of processing, such as cellulose fibers.

"Biodegradable" materials are defined as materials whose physical and chemical properties undergo deterioration and completely degrade when exposed to the environment. This property, therefore, relates to the end-of-life of the material. Bio-based materials can be biodegradable or non-degradable. Similarly, while many bio-based materials are biodegradable (e.g., starch), not all biodegradable materials are bio-based.

In context of the present invention, a "biodegradable" ingredient, or a "biodegradable" material in general, for instance a shell material, is a material which meets the pass criteria for "inherently biodegradable" and/or "readily biodegradable" in at least one OECD biodegradation study. In order to avoid any ambiguity, this means that if an ingredient passes one test but fails one or more other ones, the pass result overrules the other test results.

For assessment of the pass criteria for "readily biodegradable", the biodegradation study can be selected from the group consisting of OECD Method 301B, OECD Method 301C, OECD Method 301D, OECD Method 301F and OECD Method 310.

OECD Method 301B, OECD Method 301C, OECD Method 301D and OECD Method 301F are described in the OECD Guidelines for the Testing of Chemicals, Section 3, Test No. 301: Ready Biodegradability (Adopted: 17 Jul. 1992; https://doi.org/10.1787/9789264070349-en).

OECD Method 310 is described in the OECD Guidelines for the Testing of Chemicals, Section 3, Test No. 310: Ready Biodegradability—CO2 in sealed vessels (Headspace Test) (Adopted: 23 Mar. 2006; Corrected: 26 Sep. 2014; https://doi.org/10.1787/9789264016316-en).

In a particular aspect of the present invention, the pass criteria for "readily biodegradable" are assessed according to OECD Method 301F, which refers to manometric respirometry. In this method the pass level for "ready biodegradability" is to reach 60% of theoretical oxygen demand and/or chemical oxygen demand. This pass value has to be reached in a 10-day window within the 28-day period of the test. The 10-day window begins when the degree of biodegradation has reached 10% of theoretical oxygen demand and/or chemical oxygen demand and must end before day 28 of the test.

Given a positive result in a test of ready biodegradability, it may be assumed that the chemical will undergo rapid and ultimate biodegradation in the environment (Introduction to the OECD Guidelines for the Testing of Chemicals, Section 3, Part 1: Principles and Strategies Related to the Testing of Degradation of Organic Chemicals; Adopted: July 2003).

For assessment of the pass criteria for "inherently biodegradable", the biodegradation study can be OECD Method 302C, but also OECD Method 301F can be used, although with different pass criteria. Also these methods are suitable for volatile materials.

OECD Method 302C is described in the OECD Guidelines for the Testing of Chemicals, Section 3, Test No. 302C: Inherent Biodegradability: Modified MITI Test (II) (Adopted: 12 May 1981; Corrected 8 Sep. 2009; https://doi.org/10.1787/9789264070400-en).

In a particular aspect of the present invention, the pass criteria for "inherently biodegradable" are assessed by OECD Method 302C. In this method the pass level for "inherently biodegradability" is then to reach 70% of theoretical oxygen demand. There is no time limit to reach this level.

Biodegradation rates above 70% may be regarded as evidence of inherent, ultimate biodegradability (OECD Guidelines for the Testing of Chemicals, Section 3, Part 1: Principles and Strategies Related to the Testing of Degradation of Organic Chemicals; Adopted: July 2003).

If OECD Method 301F is used for assessment of the pass criteria for "inherently biodegradable", the pass level is 60% of theoretical oxygen demand and/or chemical oxygen demand. This pass value can be reached after the 28-day period of the test, which is usually extended to 60 days. No 10-day window applies.

In the present context, if an ingredient is an essential oil, it is considered to be a "biodegradable ingredient" if all of its constituents present at a level ≥1% fall under the definition of "inherently biodegradable" and/or "readily biodegradable" as defined herein above. However, the essential oil can also be subjected to the above-mentioned biodegradation tests.

The term "polymeric surfactant" refers to a polysaccharide or a mixture comprising at least one polysaccharide that has the function of lowering the interfacial tension between an oil phase and an aqueous phase, when dissolved in one or both of the phases. This ability to lower interfacial tension is called "interfacial activity".

The term "formed by combination" in the present context means that the combined components are brought in contact with each other to generate an assembly which comprises moieties from both components. The nature of the interaction within the assembly may be dispersion forces, electrostatic forces, hydrogen bonds or covalent bonds.

The term "hydrocolloid" refers to high molecular weight polysaccharides and proteins extracted from plants, crustaceans and algae or produced by microbial synthesis. A hydrocolloid is a suspension of particles in water where the particles are molecules that bind to water and to one another. Its functions include thickening and jellification of aqueous solutions, stabilization of emulsions and dispersions, and the controlled release of flavours.

In the context of the present invention, the leakage is considered as significantly reduced if the amount of the benefit agent that has leached in a consumer product base within a period of 1 month at 37° C. is less than 75%, preferably less than 50%, more preferably less than 25%, and still more preferably less than 10% of the nominal amount of encapsulated benefit agent.

In the context of the present invention, all percentages refer to weight percentages (% w/w), unless otherwise indicated.

DETAILED DESCRIPTION

Preferred and/or optional features of the invention will now be set out. Any aspect of the invention may be combined with any other aspect of the invention unless the context demands otherwise. Any of the preferred or optional features of any aspect may be combined, singly or in combination, with any aspect of the invention, as well as with any other preferred or optional features, unless the context demands otherwise.

Encapsulated Composition

The applicant has surprisingly and unexpectedly found that the encapsulated compositions comprising a higher percentage of biodegradable carbon containing ingredients as defined herein show similar or better properties than the encapsulated compositions of the prior art. The properties relate to the encapsulation efficiency of the benefit agent into the microcapsule and to the balance between robustness during storage and benefit agent release profile during use of the encapsulated composition into a consumer product.

The invention, therefore, provides an encapsulated composition comprising at least one core-shell microcapsule, wherein the at least one core-shell microcapsule comprises a core comprising at least one benefit agent and a shell surrounding the core, wherein the shell comprises:
   a) a polymeric stabilizer that is formed by combination of a bio-based polymeric surfactant with at least one aminosilane;
   b) a bio-based and biodegradable hydrocollolid; and
   c) a linker derived from a bio-based and biodegradable epoxy resin.

Benefit Agent

Suitable benefit agents to be incorporated into the core of the core-shell microcapsules of the present invention include perfume ingredients, flavor ingredients, cosmetic ingredients, bioactive agents (such as bactericides, insect repellents and pheromones), substrate enhancers (such as silicones and brighteners), enzymes (such as lipases and proteases), dyes, pigments and nutraceuticals In one embodiment, the at least one benefit agent may be at least one fragrance ingredient. A comprehensive list of fragrance ingredients that may be encapsulated in accordance with the present invention may be found in the perfumery literature, for example "Perfume & Flavor Chemicals", S. Arctander (Allured Publishing, 1994). Encapsulated fragrance ingredients according to the present invention preferably comprise fragrance ingredients selected from the group consisting of ACETYL ISOEUGENOL ((E)-2-methoxy-4-(prop-1-en-1-yl)phenyl acetate); ADOXAL (2,6, 10-trimethylundec-9-enal); AGRUMEX (2-(tert-butyl)cyclohexyl acetate); ALDEHYDE C 10 DECYLIC (decanal); ALDEHYDE C 11 MOA (2-methyldecanal); ALDEHYDE C 11 UNDECYLENIC (undec-10-enal); ALDEHYDE C 110 UNDECYLIC (undecanal); ALDEHYDE C 12 LAURIC (dodecanal); ALDEHYDE C 12 MNA PURE (2-methylundecanal); ALDEHYDE C 8 OCTYLIC (octanal); ALDEHYDE C 9 ISONONYLIC (3,5, 5-trimethylhexanal); ALDEHYDE C 9 NONYLIC FOOD GRADE (nonanal); ALDEHYDE C 90 NONENYLIC ((E)-non-2-enal); ALDEHYDE ISO C 11 ((E)-undec-9-enal); ALDEHYDE MANDARINE ((E)-dodec-2-enal); ALLYL AMYL GLYCOLATE (prop-2-enyl 2-(3-methylbutoxy) acetate); ALLYL CAPROATE (prop-2-enyl hexanoate); ALLYL CYCLOHEXYL PROPIONATE (prop-2-enyl 3-cyclohexylpropanoate); ALLYL OENANTHATE (prop-2-enyl heptanoate); AMBER CORE1-((2-(tert-butyl)cyclohexyl) oxy)butan-2olAMBERKETAL (3,8,8,11a-tetramethyldodecahydro-1H-3,5a-epoxynaphtho[2,1-c]oxepine); AMBERMAX (1,3,4,5,6,7-hexahydro-.beta.,1,1,5,5-pentamethyl-2H-2,4a-Methanonaphthalene-8-ethanol); AMBRETTOLIDE ((Z)-oxacycloheptadec-10-en-2-one); AMBROFIX ((3aR,5aS,9aS,9bR)-3a,6,6,9a-tetramethyl-2,4,5,5a,7,8,9,9b-octahydro-1H-benzo[e][1]benzofuran); AMYL BUTYRATE (pentyl butanoate); AMYL CINNAMIC ALDEHYDE ((Z)-2-benzylideneheptanal); AMYL SALICYLATE (pentyl 2-hydroxybenzoate); ANETHOLE SYNTHETIC ((E)-1-methoxy-4-(prop-1-en-1-yl)benzene); ANISYL ACETATE (4-methoxybenzyl acetate); APHERMATE (1-(3,3-dimethylcyclohexyl)ethyl formate); AUBEPINE PARA CRESOL (4-methoxybenzaldehyde); AURANTIOL ((E)-methyl 2-((7-hydroxy-3,7-dimethyloctylidene)amino)benzoate); BELAMBRE ((1R,2S,4R)-2'-isopropyl-1,7,7-trimethylspiro[bicyclo[2.2.1]heptane-2,4'-[1,3]dioxane]); BENZALDEHYDE (benzaldehyde); BENZYL ACETATE (benzyl acetate); BENZYL ACETONE (4-phenylbutan-2-one); BENZYL BENZOATE (benzyl benzoate); BENZYL SALICYLATE (benzyl 2-hydroxybenzoate); BERRYFLOR (ethyl 6-acetoxyhexanoate); BICYCLO NONALACTONE (octahydro-2H-chromen-2-one); BOISAMBRENE FORTE ((ethoxymethoxy)cyclododecane); BOISIRIS ((1S,2R,5R)-2-ethoxy-2,6,6-trimethyl-9-methylenebicyclo[3.3.1]nonane); BORNEOL CRYSTALS ((1S,2S,4S)-1,7,7-trimethylbicyclo[2.2.1]heptan-2-ol); BORNYL ACETATE ((2S,4S)-1,7,7-trimethylbicyclo[2.2.1]heptan-2-yl acetate); BOURGEONAL (3-(4-(tert-butyl)phenyl)propanal); BUTYL BUTYRO LACTATE (1-butoxy-1-oxopropan-2-yl butanoate); BUTYL CYCLOHEXYL ACETATE PARA (4-(tert-butyl)cyclohexyl acetate); BUTYL QUINOLINE SECONDARY (2-(2-methylpropyl)quinoline); CAMPHOR SYNTHETIC ((1S,4S)-1, 7,7-trimethylbicyclo[2.2.1]heptan-2-one); CARVACROL (5-isopropyl-2-methylphenol); CARVONE LAEVO ((5R)-2-methyl-5-prop-1-en-2-ylcyclohex-2-en-1-one); CASHMERAN (1,1,2,3,3-pentamethyl-2,3,6,7-tetrahydro-1H-inden-4(5H)-one); CASSYRANE (5-tert-butyl-2-methyl-5-propyl-2H-furan); CEDRENE ((1S,8aR)-1,4,4,6-tetramethyl-2,3,3a,4,5,8-hexahydro-1H-5,8a-methanoazulene); CEDRYL ACETATE ((1S,6R,8aR)-1,4,4, 6-tetramethyloctahydro-1H-5,8a-methanoazulen-6-yl acetate); CEDRYL METHYL ETHER ((1R,6S,8aS)-6-methoxy-1,4,4,6-tetramethyloctahydro-1H-5,8a-methanoazulene); CETONE V ((E)-1-(2,6,6-trimethylcyclohex-2-en-1-yl)hepta-1,6-dien-3-one); CINNAMIC ALCOHOL SYNTHETIC ((E)-3-phenylprop-2-en-1-ol); CINNAMIC ALDEHYDE ((2E)-3-phenylprop-2-enal); CINNAMYL ACETATE ((E)-3-phenylprop-2-en-1-yl acetate); CIS JASMONE ((Z)-3-methyl-2-(pent-2-en-1-yl) cyclopent-2-enone); CIS-3-HEXENOL ((Z)-hex-3-en-1-ol); CITRAL TECH ((E)-3,7-dimethylocta-2,6-dienal); CITRATHAL R ((Z)-1,1-diethoxy-3,7-dimethylocta-2,6-diene); CITRONELLAL (3,7-dimethyloct-6-enal); CITRONELLOL EXTRA (3,7-dimethyloct-6-en-1-ol); CITRONELLYL ACETATE (3,7-dimethyloct-6-en-1-yl acetate); CITRONELLYL FORMATE (3,7-dimethyloct-6-en-1-yl formate); CITRONELLYL NITRILE (3,7-dimethyloct-6-enenitrile); CLONAL (dodecanenitrile); CORANOL (4-cyclohexyl-2-methylbutan-2-ol); COSMONE ((Z)-3-methylcyclotetradec-5-enone); COUMARIN PURE CRYSTALS (2H-chromen-2-one); CRESYL ACETATE PARA ((4-methylphenyl) acetate); CRESYL METHYL ETHER PARA (1-methoxy-4-methylbenzene); CUMIN NITRILE (4-isopropylbenzonitrile); CYCLAL C (2,4-dimethylcyclohex-3-ene-1-carbaldehyde); CYCLAMEN ALDEHYDE EXTRA (3-(4-isopropylphenyl)-2-methylpropanal); CYCLOGALBANATE (allyl 2-(cyclohexyloxy)acetate); CYCLOHEXYL ETHYL ACETATE (2-cyclohexylethyl acetate); CYCLOHEXYL SALICYLATE (cyclohexyl 2-hydroxybenzoate); CYCLOMYRAL (8,8-dimethyl-1,2,3,4,5,6,7,8-octahydronaphthalene-2-carbaldehyde); CYMENE PARA (1-methyl-4-propan-2-ylbenzene); DAMASCENONE ((E)-1-(2,6,6-trimethylcyclohexa-1,3-dien-1-yl)but-2-en-1-one); DAMASCONE ALPHA ((E)-1-(2,6,6-trimethylcyclohex-2-en-1-yl)but-2-en-1-one); DAMASCONE DELTA (1-(2,6,6-trimethyl-1-cyclohex-3-enyl)but-2-en-1-one); DECALACTONE GAMMA (5-hexyloxolan-2-one); DECENAL-4-TRANS ((E)-dec-4-enal); DELPHONE (2-pentylcyclopentanone); DELTA-3 CARENE ((1S,6S)-3, 7,7-trimethylbicyclo[4.1.0]hept-3-ene); DIHEXYL FUMARATE (dihexyl-but-2-enedioate); DIHYDRO ANETHOLE (1-methoxy-4-propylbenzene); DIHYDRO JASMONE (3-methyl-2-pentylcyclopent-2-enone); DIHYDRO MYRCENOL (2,6-dimethyloct-7-en-2-ol); DIMETHYL ANTHRANILATE (methyl 2-(methylamino)benzoate); DIMETHYL BENZYL CARBINOL (2-methyl-1-phenylpropan-2-ol); DIMETHYL BENZYL CARBINYL ACETATE (2-methyl-1-phenylpropan-2-yl acetate); DIMETHYL BENZYL CARBINYL BUTYRATE (2-methyl-1- phenylpropan-2-yl butanoate); DIMETHYL OCTENONE (4,7-dimethyloct-6-en-3-one); DIMETOL (2,6-dimethylheptan-2-ol); DIPENTENE (1-methyl-4-(prop-1-en-2-yl)cyclohex-1-ene); DIPHENYL OXIDE (oxydibenzene); DODECALACTONE DELTA (6-heptyltetrahydro-2H-pyran-2-one); DODECALACTONE GAMMA (5-octyloxolan-2-one); DODECENAL ((E)-dodec-2-enal); DUPICAL ((E)-4-((3aS,7aS)-hexahydro-1H-4,7-methanoinden-5(6H)-ylidene)butanal); EBANOL ((E)-3-methyl-5-(2,2,3-trimethylcyclopent-3-en-1-yl) pent-4-en-2-ol); ESTERLY (ethyl cyclohexyl carboxylate); ETHYL ACETATE (ethyl acetate); ETHYL ACETOACETATE (ethyl 3-oxobutanoate); ETHYL CINNAMATE (ethyl 3-phenylprop-2-enoate); ETHYL HEXANOATE (ethyl hexanoate); ETHYL LINALOOL ((E)-3,7-dimethylnona-1,6-dien-3-ol); ETHYL LINALYL ACETATE ((Z)-3,7-dimethylnona-1,6-dien-3-yl acetate); ETHYL MALTOL (2-ethyl-3-hydroxy-4H-pyran-4-one); ETHYL METHYL-2-BUTYRATE (ethyl 2-methylbutanoate); ETHYL OCTANOATE (ethyl octanoate); ETHYL OENANTHATE (ethyl heptanoate); ETHYL PHENYL GLYCIDATE (ethyl 3-phenyloxirane-2-carboxylate); ETHYL SAFRANATE (ethyl 2,6,6-trimethylcyclohexa-1,3-diene-1-carboxylate); ETHYL VANILLIN (3-ethoxy-4-hydroxybenzaldehyde); ETHYLENE BRASSYLATE (1,4-dioxacycloheptadecane-5,17-dione); EUCALYPTOL ((1s,4s)-1,3,3-trimethyl-2-oxabicyclo[2.2.2]octane); EUGENOL (4-allyl-2-methoxyphenol); EVERNYL (methyl 2,4-dihydroxy-3,6-dimethylbenzoate); FENCHYL ACETATE ((2S)-1,3,3-trimethylbicyclo[2.2.1]heptan-2-yl acetate); FENCHYL ALCOHOL ((1S,2R,4R)-1,3,3-trimethylbicyclo[2.2.1]heptan-2-ol); FENNALDEHYDE (3-(4-methoxyphenyl)-2-methylpropanal); FIXAMBRENE (3a,6,6,9a-tetramethyldodecahydronaphtho[2,1-b]furan); FIXOLIDE (1-(3,5,5,6,8,8-hexamethyl-5,6,7,8-tetrahydronaphthalen-2-yl)ethanone); FLORALOZONE (3-(4-ethylphenyl)-2,2-dimethylpropanal); FLORHYDRAL (3-(3-isopropylphenyl)butanal); FLORIDILE ((E)-undec-9-enenitrile); FLOROCYCLENE ((3aR,6S,7aS)-3a,4,5,6,7,7a-hexahydro-1H-4,7-methanoinden-6-yl propanoate); FLOROPAL (2,4,6-trimethyl-4-phenyl-1,3-dioxane); FLOROSA HC (tetrahydro-4-methyl-2-(2-methylpropyl)-2H-pyran-4-ol); FRESKOMENTHE (2-(sec-butyl)cyclohexanone); FRUCTONE (ethyl 2-(2-methyl-1,3-dioxolan-2-yl)acetate); FRUITATE ((3aS,4S,7R,7aS)-ethyl octahydro-1H-4,7-methanoindene-3a-carboxylate); FRUTONILE (2-methyldecanenitrile); GALBANONE PURE (1-(5,5-dimethylcyclohex-1-en-1-yl)pent-4-en-1-one); GARDENOL (1-phenylethyl acetate); GARDOCYCLENE ((3aR,6S,7aS)-3a,4,5,6,7,7a-hexahydro-1H-4,7-methanoinden-6-yl 2-methyl propanoate); GERANIOL ((E)-3,7-dimethylocta-2,6-dien-1-ol); GERANYL ACETATE ((E)-3,7-dimethylocta-2,6-dien-1-yl acetate); GERANYL CROTONATE ((E)-3,7-dimethylocta-2,6-dien-1-yl but-2-enoate); GERANYL ISOBUTYRATE ((E)-3,7-dimethylocta-2,6-dien-1-yl 2-methylpropanoate); GIVESCONE (ethyl 2-ethyl-6,6-dimethylcyclohex-2-enecarboxylate); HABANOLIDE ((E)-oxacyclohexadec-12-en-2-one); HEDIONE (methyl 3-oxo-2-pentylcyclopentaneacetate); HELIOTROPINE CRYSTALS (benzo[d][1,3]dioxole-5-carbaldehyde); HERBANATE ((2S)-ethyl 3-isopropylbicyclo[2.2.1]hept-5-ene-2-carboxylate); HEXENAL-2-TRANS ((E)-hex-2-enal); HEXENOL-3-CIS ((Z)-hex-3-en-1-ol); HEXENYL-3-CIS ACETATE ((Z)-hex-3-en-1-yl acetate); HEXENYL-3-CIS BUTYRATE ((Z)-hex-3-en-1-yl butanoate); HEXENYL-3-CIS ISOBUTYRATE ((Z)-hex-3-en-1-yl 2-methylpropanoate); HEXENYL-3-CIS SALICYLATE ((Z)-hex-3-en-1-yl 2-hydroxybenzoate); HEXYL ACETATE (hexyl acetate); HEXYL BENZOATE (hexyl benzoate); HEXYL BUTYRATE (hexyl butanoate); HEXYL CINNAMIC ALDEHYDE ((E)-2-benzylideneoctanal); HEXYL ISOBUTYRATE (hexyl 2-methylpropanoate); HEXYL SALICYLATE (hexyl 2-hydroxybenzoate); HYDROXYCITRONELLAL (7-hydroxy-3,7-dimethyloctanal); INDOFLOR (4,4a,5,9b-tetrahydroindeno[1,2-d][1,3]dioxine); INDOLE PURE (1H-indole); INDOLENE (8,8-di(1H-indol-3-yl)-2,6-dimethyloctan-2-ol); IONONE BETA ((E)-4-(2,6,6-trimethylcyclohex-1-en-1-yl) but-3-en-2-one); IRISANTHEME ((E)-3-methyl-4-(2,6,6-trimethylcyclohex-2-en-1-yl) but-3-en-2-one); IRISONE ALPHA ((E)-4-(2,6,6-trimethylcyclohex-2-en-1-yl) but-3-en-2-one); IRONE ALPHA ((E)-4-(2,5,6,6-tetramethylcyclohex-2-en-1-yl) but-3-en-2-one); ISO E SUPER (1-(2,3,8,8-tetramethyl-1,2,3,4,5,6,7,8-octahydronaphthalen-2-yl) ethanone); ISOAMYL ACETATE (3-methylbutyl acetate); ISOAMYL BUTYRATE (3-methylbutyl butanoate); ISOBUTYL METHOXY PYRAZINE (2-methylpropyl 3-methoxypyrazine); ISOCYCLOCITRAL (2,4,6-trimethylcyclohex-3-enecarbaldehyde); ISOEUGENOL ((E)-2-methoxy-4-(prop-1-en-1-yl)phenol); ISOJASMONE B 11 (2-hexylcyclopent-2-en-1-one); ISOMENTHONE DL (2-isopropyl-5-methylcyclohexanone); ISONONYL ACETATE (3,5,5-trimethylhexyl acetate); ISOPROPYL METHYL-2-BUTYRATE (isopropyl 2-methylbutanoate); ISOPROPYL QUINOLINE (6-isopropylquinoline); ISORALDEINE ((E)-3-methyl-4-(2,6,6-trimethylcyclohex-2-en-1-yl) but-3-en-2-one); JASMACYCLENE ((3aR,6S,7aS)-3a,4,5,6,7,7a-hexahydro-1H-4,7-methanoinden-6-yl acetate); JASMONE CIS ((Z)-3-methyl-2-(pent-2-en-1-yl) cyclopent-2-enone); JASMONYL (3-butyl-5-methyltetrahydro-2H-pyran-4-yl acetate); JASMOPYRANE FORTE (3-pentyltetrahydro-2H-pyran-4-yl acetate); JAVANOL ((1-methyl-2-((1,2,2-trimethylbicyclo[3.1.0]hexan-3-yl)methyl)cyclopropyl) methanol); KOAVONE ((Z)-3,4,5,6,6-pentamethylhept-3-en-2-one); LAITONE (8-isopropyl-1-oxaspiro[4.5]decan-2-one); LEAF ACETAL ((Z)-1-(1-ethoxyethoxy) hex-3-ene); LEMONILE ((2E,6Z)-3,7-dimethylnona-2,6-dienenitrile); LIFFAROME ((Z)-hex-3-en-1-yl methyl carbonate); LILIAL (3-(4-(tert-butyl)phenyl)-2-methylpropanal); #N/A LINALOOL (3,7-dimethylocta-1,6-dien-3-ol); LINALOOL OXIDE (2-(5-methyl-5-vinyltetrahydrofuran-2-yl)propan-2-ol); LINALYL ACETATE (3,7-dimethylocta-1,6-dien-3-yl acetate); MAHONIAL ((4E)-9-hydroxy-5,9-dimethyl-4-decenal); MALTOL (3-hydroxy-2-methyl-4H-pyran-4-one); MALTYL ISOBUTYRATE (2-methyl-4-oxo-4H-pyran-3-yl 2-methylpropanoate); MANZANATE (ethyl 2-methylpentanoate); MAYOL ((4-isopropylcyclohexyl)methanol); MEFROSOL (3-methyl-5-phenylpentan-1-ol); MELONAL (2,6-dimethylhept-5-enal); #N/A #N/A MERCAPTO-8-METHANE-3-ONE (mercapto-para-menthan-3-one); METHYL ANTHRANILATE (methyl 2-aminobenzoate); METHYL BENZOATE (methyl benzoate); METHYL CEDRYL KETONE (1-((1S,8aS)-1,4,4,6-tetramethyl-2,3,3a,4,5,8-hexahydro-1H-5,8a-methanoazulen-7-yl) ethanone); METHYL CINNAMATE (methyl 3-phenylprop-2-enoate); METHYL DIANTILIS (2-ethoxy-4-(methoxymethyl)phenol); METHYL DIHYDRO ISOJASMONATE (methyl 2-hexyl-3-oxocyclopentane-1-carboxylate); METHYL HEPTENONE PURE (6-methylhept-5-en-2-one); METHYL LAITONE (8-methyl-1-oxaspiro[4.5]decan-2-one); METHYL NONYL KETONE (undecan-2-one); METHYL OCTYNE CARBONATE (methyl non-2-ynoate); METHYL PAMPLEMOUSSE (6,6-dimethoxy-2,5,5-trimethylhex-2-ene); METHYL SALICYLATE (methyl 2-hydroxybenzoate); MUSCENONE ((Z)-3- methylcyclopentadec-5-enone); MYRALDENE (4-(4-methylpent-3-en-1-yl)cyclohex-3-enecarbaldehyde); MYRCENE (7-methyl-3-methyleneocta-1,6-diene); MYSTIKAL (2-methylundecanoic acid); NECTARYL (2-(2-(4-methylcyclohex-3-en-1-yl)propyl)cyclopentanone); NEOBERGAMATE FORTE (2-methyl-6-methyleneoct-7-en-2-yl acetate); NEOCASPIRENE EXTRA (10-isopropyl-2,7-dimethyl-1-oxaspiro[4.5]deca-3,6-diene); NEOFOLIONE ((E)-methyl non-2-enoate); NEROLEX ((2Z)-3,7-dimethylocta-2,6-dien-1-ol); NEROLIDOL ((Z)-3,7,11-trimethyldodeca-1,6,10-trien-3-ol); NEROLIDYLE ((Z)-3,7,11-trimethyldodeca-1,6,10-trien-3-yl acetate); NEROLINE CRYSTALS (2-ethoxynaphthalene); NEROLIONE (1-(3-methylbenzofuran-2-yl)ethanone); NERYL ACETATE ((Z)-3,7-dimethylocta-2,6-dien-1-yl acetate); NIRVANOLIDE ((E)-13-methyloxacyclopentadec-10-en-2-one); NONADIENAL ((2E,6Z)-nona-2,6-dienal); NONADIENOL-2,6((2Z,6E)-2,6-nonadien-1-ol); NONADYL (6,8-dimethylnonan-2-ol); NONALACTONE GAMMA (5-pentyloxolan-2-one); NONENAL-6-CIS ((Z)-non-6-enal); NONENOL-6-CIS ((Z)-non-6-en-1-ol); NOPYL ACETATE (2-(6,6-dimethylbicyclo[3.1.1]hept-2-en-2-yl) ethyl acetate); NYMPHEAL (3-(4-(2-methylpropyl)-2-methylphenyl) propanal); OCTALACTONE DELTA (6-propyltetrahydro-2H-pyran-2-one); METHYL HEXYL KETONE (octan-2-one); ORANGER CRYSTALS (1-(2-naphtalenyl)-ethanone); ORIVONE (4-(tert-pentyl)cyclohexanone); PANDANOL ((2-methoxyethyl)benzene); PARA TERT BUTYL CYCLOHEXYL ACETATE (4-(tert-butyl)cyclohexyl acetate); PARADISAMIDE (2-ethyl-N-methyl-N-(m-tolyl)butanamide); PEACH PURE (5-heptyldihydrofuran-2(3H)-one); PELARGENE (2-methyl-4-methylene-6-phenyltetrahydro-2H-pyran); PELARGOL (3,7-dimethyloctan-1-ol); PEONILE (2-cyclohexylidene-2-phenylacetonitrile); PETALIA (2-cyclohexylidene-2-(o-tolyl) acetonitrile); PHARAONE (2-cyclohexylhepta-1,6-dien-3-one); PHENOXY ETHYL ISOBUTYRATE (2-(phenoxy)ethyl 2-methylpropanoate); PHENYL ACETALDEHYDE (2-phenyl-ethanal); PHENYL ETHYL ACETATE (2-phenylethyl acetate); PHENYL ETHYL ALCOHOL (2-phenylethanol); PHENYL ETHYL ISOBUTYRATE (2-phenylethyl 2-methylpropanoate); PHENYL ETHYL PHENYL ACETATE (2-phenylethyl 2-phenylacetate); PHENYL PROPYL ALCOHOL (3-phenylpropan-1-ol); PINENE ALPHA (2,6,6-trimethylbicyclo[3.1.1]hept-2-ene); PINENE BETA (6,6-dimethyl-2-methylenebicyclo[3.1.1]heptane); PINOACETALDEHYDE (3-(6,6-dimethylbicyclo[3.1.1]hept-2-en-2-yl)propanal); PIVAROSE (2,2-dimethyl-2-pheylethyl propanoate); POMAROSE ((2E,5E)-5,6,7-trimethylocta-2,5-dien-4-one); POMELOL (2,4,7-Trimethyl-6-octen-1-ol); PRECYCLEMONE B (1-methyl-4-(4-methylpent-3-en-1-yl)cyclohex-3-enecarbaldehyde); PRENYL ACETATE (3-methyl-but-2-en-1-yl acetate); PRUNOLIDE (5-pentyldihydrofuran-2(3H)-one); RADJANOL SUPER ((E)-2-ethyl-4-(2,2,3-trimethylcyclopent-3-en-1-yl) but-2-en-1-ol); RASPBERRY KETONE (4-(4-hydroxyphenyl)butan-2-one); RHUBAFURAN (2,4-dimethyl-4-phenyltetrahydrofuran); ROSACETOL (2,2,2-trichloro-1-phenylethyl acetate); ROSALVA (dec-9-en-1-ol); ROSE OXIDE (4-methyl-2-(2-methylprop-1-en-1-yl) tetrahydro-2H-pyran); ROSE OXIDE CO (4-methyl-2-(2-methylprop-1-en-1-yl)tetrahydro-2H-pyran); ROSYFOLIA (1-methyl-2-(5-methylhex-4-en-2-yl)cyclopropylmethanol); ROSYRANE SUPER (4-methyl-2-phenyl-3,6-dihydro-2H-pyran); SAFRALEINE (2,3,3-trimethyl-1-indanone); SAFRANAL (2,6,6-trimethylcyclohexa-1,3-dienecarbaldehyde); SANDALORE EXTRA (3-methyl-5-(2,2,3-trimethylcyclopent-3-en-1-yl)pentan-2-ol); SCENTAURUS CLEAN (ethyl(Z)-2-acetyl-4-methyltridec-2-enoate); SCENTAURUS JUICY (4-(dodecylthio)-4-methylpentan-2-one); SERENOLIDE (2-(1-(3,3-dimethylcyclohexyl) ethoxy)-2-methylpropyl cyclopropanecarboxylate); SILVANONE SUPRA (cyclopentadecanone, hexadecanolide); SILVIAL (2-methyl-3-[4-(2-methylpropyl)phenyl]propanal); SPIROGALBANONE (1-(spiro[4.5]dec-6-en-7-yl) pent-4-en-1-one); STEMONE ((E)-5-methylheptan-3-one oxime); STYRALLYL ACETATE (1-phenylethyl acetate); SUPER MUGUET ((E)-6-ethyl-3-methyloct-6-en-1-ol); SYLKOLIDE ((E)-2-((3,5-dimethylhex-3-en-2-yl)oxy)-2-methylpropyl cyclopropanecarboxylate); TERPINENE ALPHA (1-methyl-4-propan-2-ylcyclohexa-1,3-diene); TERPINENE GAMMA (1-methyl-4-propan-2-ylcyclohexa-1,4-diene); TERPINEOL (2-(4-methylcyclohex-3-en-1-yl) propan-2-ol); TERPINEOL ALPHA (2-(4-methyl-1-cyclohex-3-enyl)propan-2-ol); TERPINEOL PURE (2-(4-methylcyclohex-3-en-1-yl)propan-2-ol); TERPINOLENE (1-methyl-4-(propan-2-ylidene)cyclohex-1-ene); TERPINYL ACETATE (2-(4-methyl-1-cyclohex-3-enyl)propan-2-yl acetate); TETRAHYDRO LINALOOL (3,7-dimethyloctan-3-ol); TETRAHYDRO MYRCENOL (2,6-dimethyloctan-2-ol); THIBETOLIDE (oxacyclohexadecan-2-one); THYMOL (2-isopropyl-5-methylphenol); TOSCANOL (1-(cyclopropylmethyl)-4-methoxybenzene); TRICYCLAL (2,4-dimethylcyclohex-3-enecarbaldehyde); TRIDECENE-2-NITRILE ((E)-tridec-2-enenitrile); TRIFERNAL (3-phenylbutanal); TROPIONAL (3-(benzo[d][1,3] dioxol-5-yl)-2-methylpropanal); TROPIONAL (3-(benzo[d][1,3]dioxol-5-yl)-2-methylpropanal); UNDECATRIENE ((3E,5Z)-undeca-1,3,5-triene); UNDECAVERTOL ((E)-4-methyldec-3-en-5-ol); VANILLIN (4-hydroxy-3-methoxybenzaldehyde); VELOUTONE (2,2,5-trimethyl-5-pentylcyclopentanone); VELVIONE ((Z)-cyclohexadec-5-enone); VIOLET NITRILE ((2E,6Z)-nona-2,6-dienenitrile); YARA YARA (2-methoxynaphtalene); ZINARINE (2-(2,4-dimethylcyclohexyl) pyridine; BOIS CEDRE ESS CHINE (cedar wood oil); EUCALYPTUS GLOBULUS ESS CHINA (eucalyptus oil); GALBANUM ESS (galbanum oil); GIROFLE FEUILLES ESS RECT MADAGASCAR (clove oil); LAVANDIN GROSSO OIL FRANCE ORPUR (lavandin oil); MANDARIN OIL WASHED COSMOS (mandarin oil); ORANGE TERPENES (orange terpenes); PATCHOULI ESS INDONESIE (patchouli oil); and YLANG ECO ESSENCE (ylang oil). These fragrance ingredients are particularly suitable for obtaining stable and performing microcapsules, owing to their favorable lipophilicity and olfactive performance.

In particularly preferred embodiments of the present invention, more than 75%, preferably more than 80%, even more preferably more than 85%, even still more preferably more than 90%, even yet still more preferably more than 95%, of the fragrance ingredients are biodegradable and selected from ACETYL ISOEUGENOL ((E)-2-methoxy-4-(prop-1-en-1-yl)phenyl acetate); ADOXAL (2,6, 10-trimethylundec-9-enal); AGRUMEX (2-(tert-butyl)cyclohexyl acetate); ALDEHYDE C 10 DECYLIC (decanal); ALDEHYDE C 11 UNDECYLENIC (undec-10-enal); ALDEHYDE C 110 UNDECYLIC (undecanal); ALDEHYDE C 12 LAURIC (dodecanal); ALDEHYDE C 12 MNA (2-methylundecanal); ALDEHYDE C 8 OCTYLIC (octanal); CYCLAMEN ALDEHYDE EXTRA (3-(4-isopropylphenyl)-2-methylpropanal); ALDEHYDE ISO C 11 ((E)-undec-9-enal); ALLYL AMYL GLYCOLATE (prop-2-enyl 2-(3-methylbutoxy)acetate); ALLYL CYCLOHEXYL PRO- PIONATE (prop-2-enyl 3-cyclohexylpropanoate); ALLYL OENANTHATE (prop-2-enyl heptanoate); AMBRETTOLIDE ((Z)-oxacycloheptadec-10-en-2-one); AMBROFIX ((3aR,5aS,9aS,9bR)-3a,6,6,9a-tetramethyl-2,4,5,5a,7,8,9,9b-octahydro-1H-benzo[e][1]benzofuran); AMYL SALICYLATE (pentyl 2-hydroxybenzoate); AUBEPINE PARA CRESOL (4-methoxybenzaldehyde); BENZYL ACETATE (benzyl acetate); BENZYL SALICYLATE (benzyl 2-hydroxybenzoate); BORNYL ACETATE ((2S,4S)-1,7,7-trimethylbicyclo[2.2.1]heptan-2-yl acetate); CARVACROL (5-isopropyl-2-methylphenol); CEDRENE ((1S,8aR)-1,4,4,6-tetramethyl-2,3,3a,4,5,8-hexahydro-1H-5,8a-methanoazulene); CEDRYL ACETATE ((1S,6R,8aR)-1,4,4,6-tetramethyloctahydro-1H-5,8a-methanoazulen-6-yl acetate); CEDRYL METHYL ETHER ((1R,6S,8aS)-6-methoxy-1,4,4,6-tetramethyloctahydro-1H-5,8a-methanoazulene); CITRAL ((E)-3,7-dimethylocta-2,6-dienal); CITRONELLOL (3,7-dimethyloct-6-en-1-ol); CITRONELLYL ACETATE (3,7-dimethyloct-6-en-1-yl acetate); COSMONE ((Z)-3-methylcyclotetradec-5-enone); CRESYL METHYL ETHER PARA (1-methoxy-4-methylbenzene); CYCLOHEXYL ETHYL ACETATE (2-cyclohexylethyl acetate); CYCLOHEXYL SALICYLATE (cyclohexyl 2-hydroxybenzoate); DAMASCENONE ((E)-1-(2,6,6-trimethylcyclohexa-1,3-dien-1-yl)but-2-en-1-one); DAMASCONE ALPHA ((E)-1-(2,6,6-trimethylcyclohex-2-en-1-yl)but-2-en-1-one); DECALACTONE GAMMA (5-hexyloxolan-2-one); DECENAL-4-TRANS ((E)-dec-4-enal); DIHYDRO MYRCENOL (2,6-dimethyloct-7-en-2-ol); DIPHENYL OXIDE (oxydibenzene); DIHYDRO ANETHOLE (1-methoxy-4-propylbenzene); DIHYDRO JASMONE (3-methyl-2-pentylcyclopent-2-enone); DIMETHYL ANTHRANILATE (methyl 2-(methylamino)benzoate); DIMETHYL BENZYL CARBINYL ACETATE (2-methyl-1-phenylpropan-2-yl acetate); DIMETHYL BENZYL CARBINYL BUTYRATE (2-methyl-1-phenylpropan-2-yl butanoate); DIMETOL (2,6-dimethylheptan-2-ol); DODECALACTONE DELTA (6-heptyltetrahydro-2H-pyran-2-one); DODECALACTONE GAMMA (5-octyloxolan-2-one); DODECENAL ((E)-dodec-2-enal); EBANOL ((E)-3-methyl-5-(2,2,3-trimethylcyclopent-3-en-1-yl)pent-4-en-2-ol); ETHYL HEXANOATE (ethyl hexanoate); ETHYL METHYL-2-BUTYRATE (ethyl 2-methyl butyrate); ETHYL MALTOL (2-ethyl-3-hydroxy-4H-pyran-4-one); ETHYL OENANTHATE (ethyl heptanoate); ETHYL VANILLIN (3-ethoxy-4-hydroxybenzaldehyde); ETHYLENE BRASSYLATE (1,4-dioxacycloheptadecane-5,17-dione); EUCALYPTOL ((1s,4s)-1,3,3-trimethyl-2-oxabicyclo[2.2.2]octane); EUGENOL (4-allyl-2-methoxyphenol); EVERNYL (methyl 2,4-dihydroxy-3,6-dimethylbenzoate); FIXAMBRENE (3a,6,6,9a-tetramethyldodecahydronaphtho[2,1-b]furan); FLORHYDRAL (3-(3-isopropylphenyl)butanal); FLORIDILE ((E)-undec-9-enenitrile); GALBANONE PURE (1-(5,5-dimethylcyclohex-1-en-1-yl)pent-4-en-1-one); GARDENOL (1-phenylethyl acetate); GERANIOL ((E)-3,7-dimethylocta-2,6-dien-1-ol); GERANYL ACETATE ((E)-3,7-dimethylocta-2,6-dien-1-yl acetate); HABANOLIDE ((E)-oxacyclohexadec-12-en-2-one); HEDIONE (methyl 3-oxo-2-pentylcyclopentaneacetate); HEXENAL-2-TRANS ((E)-hex-2-enal); HEXENOL-3-CIS ((Z)-hex-3-en-1-ol); HEXENYL-3-CIS ACETATE ((Z)-hex-3-en-1-yl acetate); HEXENYL-3-CIS SALICYLATE ((Z)-hex-3-en-1-yl 2-hydroxybenzoate); HEXYL ACETATE (hexyl acetate); INDOLENE (8,8-di(1H-indol-3-yl)-2,6-dimethyloctan-2-ol); IONONE BETA ((E)-4-(2,6,6-trimethylcyclohex-1-en-1-yl)but-3-en-2-one); IRISANTHEME ((E)-3-methyl-4-(2,6,6-trimethylcyclohex-2-en-1-yl)but-3-en-2-one); IRISONE ALPHA ((E)-4-(2,6,6-trimethylcyclohex-2-en-1-yl)but-3-en-2-one); ISOAMYL ACETATE (3-methylbutyl acetate); ISOAMYL BUTYRATE (3-methylbutyl butanoate); ISOEUGENOL ((E)-2-methoxy-4-(prop-1-en-1-yl) phenol); ISOJASMONE B 11 (2-hexylcyclopent-2-en-1-one); ISORALDEINE ((E)-3-methyl-4-(2,6,6-trimethylcyclohex-2-en-1-yl)but-3-en-2-one); JASMONYL (3-butyl-5-methyltetrahydro-2H-pyran-4-yl acetate); LAITONE (8-isopropyl-1-oxaspiro[4.5]decan-2-one); LEMONILE ((2E,6Z)-3,7-dimethylnona-2,6-dienenitrile); LINALOOL (3,7-dimethylocta-1,6-dien-3-ol); LINALOOL OXIDE (2-(5-methyl-5-vinyltetrahydrofuran-2-yl)propan-2-ol); LINALYL ACETATE (3,7-dimethylocta-1,6-dien-3-yl acetate); MANZANATE (ethyl 2-methylpentanoate); MAYOL ((4-isopropylcyclohexyl) methanol); MEFROSOL (3-methyl-5-phenylpentan-1-ol); MELONAL (2,6-dimethylhept-5-enal); MERCAPTO-8-METHANE-3-ONE (mercapto-para-menthan-3-one); METHYL ANTHRANILATE (methyl 2-aminobenzoate); METHYL BENZOATE (methyl benzoate); METHYL DIANTILIS (2-ethoxy-4-(methoxymethyl)phenol); METHYL HEPTENONE PURE (6-methylhept-5-en-2-one); METHYL LAITONE (8-methyl-1-oxaspiro[4.5]decan-2-one); METHYL OCTYNE CARBONATE (methyl non-2-ynoate); METHYL SALICYLATE (methyl 2-hydroxybenzoate); NECTARYL (2-(2-(4-methylcyclohex-3-en-1-yl)propyl)cyclopentanone); NEOFOLIONE ((E)-methyl non-2-enoate); NEROLEX ((2Z)-3,7-dimethylocta-2,6-dien-1-ol); NEROLIDOL ((Z)-3,7,11-trimethyldodeca-1,6,10-trien-3-ol); NEROLINE CRYSTALS (2-ethoxynaphthalene); NEROLIONE (1-(3-methylbenzofuran-2-yl)ethanone); NERYL ACETATE ((Z)-3,7-dimethylocta-2,6-dien-1-yl acetate); NONADIENAL ((2E,6Z)-nona-2,6-dienal); NONENAL-6-CIS ((Z)-non-6-enal); NONENOL-6-CIS ((Z)-non-6-en-1-ol); NYMPHEAL (3-(4-(2-methylpropyl)-2-methylphenyl)propanal); OCTALACTONE DELTA (6-propyltetrahydro-2H-pyran-2-one); ORANGER CRYSTALS (1-(2-naphtalenyl)-ethanone); PARA TERT BUTYL CYCLOHEXYL ACETATE (4-(tert-butyl)cyclohexyl acetate); PEACH PURE (5-heptyldihydrofuran-2(3H)-one); PELARGOL (3,7-dimethyloctan-1-ol); PHENYL ETHYL ACETATE (2-phenylethyl acetate); PINENE ALPHA (2,6,6-trimethylbicyclo[3.1.1]hept-2-ene); PINENE BETA (6,6-dimethyl-2-methylenebicyclo[3.1.1]heptane); POMAROSE ((2E,5E)-5,6,7-trimethylocta-2,5-dien-4-one); POMELOL FF (2,4,7-Trimethyl-6-octen-1-ol); PRENYL ACETATE (3-methylbut-2-en-1-yl acetate); PRUNOLIDE (5-pentyldihydrofuran-2 (3H)-one); RASPBERRY KETONE (4-(4-hydroxyphenyl)butan-2-one); ROSALVA (dec-9-en-1-ol); ROSE OXIDE CO (4-methyl-2-(2-methylprop-1-en-1-yl)tetrahydro-2H-pyran); ROSYRANE SUPER (4-methyl-2-phenyl-3,6-dihydro-2H-pyran); SAFRANAL (2,6,6-trimethylcyclohexa-1,3-dienecarbaldehyde); SCENTAURUS JUICY (4-(dodecylthio)-4-methylpentan-2-one); SILVIAL (2-methyl-3-[4-(2-methylpropyl)phenyl]propanal); STYRALLYL ACETATE (1-phenylethyl acetate); SYLKOLIDE ((E)-2-((3,5-dimethylhex-3-en-2-yl)oxy)-2-methylpropyl cyclopropanecarboxylate); TERPINENE GAMMA (1-methyl-4-propan-2-ylcyclohexa-1,4-diene); TERPINEOL (2-(4-methylcyclohex-3-en-1-yl)propan-2-ol); TERPINOLENE (1-methyl-4-(propan-2-ylidene)cyclohex-1-ene); TETRAHYDRO LINALOOL (3,7-dimethyloctan-3-ol); TOSCANOL (1-(cyclopropylmethyl)-4-methoxybenzene); TRIDECENE-2-NITRILE ((E)-tridec-2-enenitrile); TRIFERNAL (3-phenylbutanal); TROPIONAL (3-(benzo[d][1,3]dioxol-5-yl)-2-methylpropanal); UNDECAVERTOL ((E)-4-methyldec-3-en-5-ol); YARA YARA (2-methoxynaphtalene); BOIS CEDRE ESS CHINE (cedar wood oil); EUCALYPTUS GLOBULUS ESS CHINA (eucalyptus oil); GALBANUM ESS (galbanum oil); GIROFLE FEUILLES ESS RECT MADAGASCAR (clove oil); LAVANDIN GROSSO OIL FRANCE ORPUR (lavandin oil); MANDARIN OIL WASHED COSMOS (mandarin oil); ORANGE TERPENES (orange terpenes); PATCHOULI ESS INDONESIE (patchouli oil); and YLANG ECO ESSENCE (ylang oil). These ingredients have the advantage of providing microcapsules which are particularly sustainable.

The at least one benefit agent may comprise at least one fragrance precursor, meaning a material that is capable of releasing a fragrance ingredient by the means of a stimulus, such as a change of temperature, the presence of oxidants, the action of enzymes or the action of light. Such fragrance precursors are well-known to the art.

The at least one benefit agent may also comprise at least one functional cosmetic ingredient. The functional cosmetic ingredients for use in the encapsulated composition are preferably hydrophobic. Preferably, the cosmetic ingredients have a calculated octanol/water partition coefficient (C log P) of 1.5 or more, more preferably 3 or more. Alternatively preferred, the C log P of the cosmetic ingredient is from 2 to 7.

Particularly useful functional cosmetic ingredients may be selected from the group consisting of emollients, smoothening ingredients, hydrating ingredients, soothing and relaxing ingredients, decorative ingredients, deodorants, anti-aging ingredients, cell rejuvenating ingredients, draining ingredients, remodeling ingredients, skin levelling ingredients, preservatives, anti-oxidants, antibacterial or bacteriostatic ingredients, cleansing ingredients, lubricating ingredients, structuring ingredients, hair conditioning ingredients, whitening ingredients, texturing ingredients, softening ingredients, anti-dandruff ingredients, and exfoliating ingredients.

Particularly useful functional cosmetic ingredients include, but are not limited to hydrophobic polymers, such as alkyldimethylsiloxanes, polymethylsil-sesquioxanes, polyethylene, polyisobutylene, styrene-ethylene-styrene and styrene-butylene-styrene block copolymers, and the like; mineral oils, such as hydrogenated isoparaffins, silicone oils and the like; vegetable oils, such as argan oil, jojoba oil, aloe vera oil, and the like; fatty acids and fatty alcohols and their esters; glycolipides; phospholipides; sphingolipides, such as ceramides; sterols and steroids; terpenes, sesquiterpenes, triterpenes and their derivatives; essential oils, such as Arnica oil, Artemisia oil, Bark tree oil, Birch leaf oil, Calendula oil, Cinnamon oil, Echinacea oil, Eucalyptus oil, Ginseng oil, Jujube oil, Helianthus oil, Jasmine oil, Lavender oil, Lotus seed oil, Perilla oil, Rosmary oil, Sandal wood oil, Tea tree oil, Thyme oil, Valerian oil, Wormwood oil, Ylang Ylang oil, and Yucca oil.

In particular, the at least one functional cosmetic ingredient may be selected from the group consisting of Sandal wood oil, such as *Fusanus spicatus* kernel oil; Panthenyl triacetate; Tocopheryl acetate; Tocopherol; Naringinin; Ethyl linoleate; Farnesyl acetate; Farnesol; Citronellyl methyl crotonate; and Ceramide-2 (1-Stearoiyl-C18-Sphingosine, CAS-No: 100403-19-8).

The at least one benefit agent may comprise agents which suppress or reduce malodour and its perception by adsorbing odour, agents which provide a warming or cooling effect, insect repellents or UV absorbers.

Polymeric Stabilizer

A polymeric stabilizer according to the present invention is formed by combination of a bio-based polymeric surfactant with at least one aminosilane.

Polymeric Surfactant

A polymeric surfactant is soluble or dispersible in an aqueous phase or in water. This means that the individual polymeric surfactant macromolecules are substantially separated from each other in these liquids. The resulting system appears transparent or hazy when inspected by the human eye.

By combining a polymeric surfactant and at least one aminosilane, an interaction between the polymeric surfactant and the at least one aminosilane takes place, resulting in an assembly which comprises moieties derived from the polymeric surfactant and moieties derived from the at least one aminosilane.

Several natural polymers are, in fact, polymeric surfactants. Most bio-based polymeric surfactants are naturally occurring polysaccharides and/or proteins. It is usually very difficult to isolate polymeric surfactants from natural sources, and their structures and compositions can vary depending on the source, therefore most of the systems used on an industrial scale undergo some degree of synthetic treatment.

In one embodiment, the bio-based polymeric surfactant comprises a polysaccharide comprising carboxylic acid groups.

The polysaccharide comprising carboxylic acid groups may comprise uronic acid units, in particular hexuronic acid units. Polysaccharides having uronic acid units, in particular hexuronic acid units, are widely available in nature.

The hexuronic acid units may be selected from the group consisting of galacturonic acid units, glucuronic acid units, such as 4-O-methyl-glucuronic acid units, guluronic acid units and mannuronic acid units and combinations thereof.

In one embodiment, the polysaccharide comprising carboxylic acid groups may be branched. Branched polysaccharides comprising carboxylic acid groups have the advantage of forming more compact networks than linear polysaccharides and therefore may favor the imperviousness of the encapsulating shell, resulting in reduced leakage and greater encapsulation efficiency.

In one embodiment, the carboxylic acid groups may be partially present in the form of the corresponding methyl ester. The percentage of carboxylic acid groups that are present in the form of the corresponding methyl ester may be from 3% to 95%, preferably from 4% to 75%.

In one embodiment, the percentage of carboxylic acid groups that are present in the form of the corresponding methyl ester ranges from 5% to 50%. In the context of the present invention, polysaccharides comprising carboxylic acid groups, of which 50% or more are present in the form of the corresponding methyl ester, are referred to as "high methoxylated".

In one embodiment, the percentage of carboxylic acid groups that are present in the form of the corresponding methyl ester may be less than 50%. In the context of the present invention, polysaccharides comprising carboxylic acid groups, of which less than 50% are present in the form of the corresponding methyl ester, are referred to as "low methoxylated".

In one embodiment, the carboxylic acid groups may be present, at least partially, in the form of the corresponding carboxylate salt, in particular the corresponding sodium, potassium, magnesium or calcium carboxylate salt.

In one embodiment of the present invention, the carboxylic acid groups may be present, at least partially, in the form of a complex with a species selected from the group consisting of a zirconium species, a titanium species and a boron species, optionally wherein the species are oxides. The presence of carboxylate salts or complexes in the polysaccharides limits their solubility in water and thereby promotes the formation of capsule shells. Furthermore, polyvalent metal species may promote intermolecular cross-linking, which may also improve the encapsulating properties of the shell.

In one embodiment, the polysaccharides comprising carboxylic acid groups may be at least partially acylated. As with the methyl ester groups mentioned hereinabove, partial acylation of the polysaccharide units can enhance the interfacial activity of the polymeric surfactant.

In one embodiment, the polymeric surfactant may be selected from the group consisting of pectin, gum Arabic, alginate and hyaluronic acid. These polysaccharides offer a most suitable combination of solubility, viscosity and interfacial activity that make the microcapsules according to the invention particularly performing in terms of handling, storage stability and olfactive performance.

Among the pectins, the carboxylic acid groups can be partially present in the form of the corresponding methyl ester. The percentage of carboxylic acid groups that are present in the form of the corresponding methyl ester can be from 3% to 95%, preferably from 4% to 75%, more preferably from 5 to 50%. Pectins comprising carboxylic groups, of which 50% or more are present in the form of the corresponding methyl ester, are referred to as "high methoxylated". Pectins comprising carboxylic acid groups, of which less than 50% are present in the form of the corresponding methyl ester, are referred to as "low methoxylated".

In one embodiment, the pectin is a high methoxylated pectin (HM pectin), such as Pectin APA 104 HM, commercialized by Roeper.

Among the two variants of gum Arabic, i.e. gum acacia Senegal and gum acacia Seyal, gum acacia Senegal is preferred, owing to the higher level of glucuronic acid in gum acacia Senegal.

Aminosilane

The at least one aminosilane employed in the formation of the polymeric stabilizer may be a compound of Formula (I).

wherein $R^1$ is a linear or branched alkyl or alkenyl residue comprising an amine functional group; $R^2$ is each independently a linear or branched alkyl group with 1 to 4 carbon atoms; and $R^3$ is each independently a H or a linear or branched alkyl group with 1 to 4 carbon atoms; and f is 0, 1 or 2.

The silane groups may undergo polycondensation reactions with one another to form a silica network at the oil/water interface that additionally stabilizes this interface.

In one embodiment, $R^2$ and $R^3$ are each independently methyl or ethyl.

In one embodiment, f is 0 or 1.

In one embodiment, $R^1$ is a $C_1$-$C_{12}$ linear or branched alkyl or alkenyl residue comprising an amine functional group. Optionally, $R^1$ is a $C_1$-$C_4$ linear or branched alkyl or alkenyl residue comprising an amine functional group.

In one embodiment, the amine functional group is a primary, a secondary or a tertiary amine.

Suitable aminosilanes wherein the amine functional group is a primary amine are aminomethyltriethoxysilane, 2-aminoethyltriethoxysilane, 3-aminopropyltriethoxysilane, 4-aminobutyltri-ethoxysilane, 5-aminopentyltriethoxysilane, 6-aminohexyltriethoxysilane, 7-aminohptyltriethoxysilane and 8-aminooctyltriethoxysilane.

In one embodiment, the at least one aminosilane is a bipodal aminosilane. By "bipodal aminosilane" it is meant a molecule comprising at least one amino group and two residues, each of these residues bearing at least one alkoxysilane moiety. Bipodal aminosilanes are particularly advantageous for forming stable oil-water interfaces, compared to conventional aminosilanes. Without wishing to be bound by theory, it is believed that this beneficial role is due to the particular, bi-directional arrangement of the silane moieties in the molecule of a bipodal aminosilane, which allows formation of a more tightly linked silica network at the oil-water interface.

In one embodiment, the bipodal aminosilane is a compound of Formula (II).

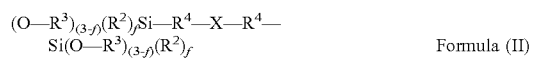

wherein X is —$NR^5$—, —$NR^5$—$CH_2$—$NR^5$—, —$NR^5$—$CH_2$—$CH_2$—$NR^5$—, —$NR^5$—CO—$NR^5$—, or

$R^2$ is each independently a linear or branched alkyl group with 1 to 4 carbon atoms;
$R^3$ is each independently H or a linear or branched alkyl group with 1 to 4 carbon atoms;
$R^4$ is each independently a linear or branched alkylene group with 1 to 6 carbon atoms;
$R^5$ is each independently H, $CH_3$ or $C_2H_5$; and
f is each independently 0, 1 or 2.

In one embodiment, $R^2$ is $CH_3$ or $C_2H_5$.
In one embodiment, $R^3$ is $CH_3$ or $C_2H_5$.
In one embodiment, $R^4$ is —$CH_2$—, —$CH_2$—$CH_2$— or —$CH_2$—$CH_2$—$CH_2$—.
In one embodiment, $R^5$ is H or $CH_3$.
In one embodiment, f is 0 or 1.

Examples of suitable bipodal aminosilanes include, but are not limited to, bis(3-(triethoxysilyl)propyl)amine, N,N'-bis(3-(trimethoxysilyl)propyl)urea, bis(3-(methyldiethoxysilyl)propyl)amine, N,N'-bis(3-(trimethoxysilyl)propyl)ethane-1,2-diamine, bis(3-(methyldimethoxysilyl)propyl)-N-methylamine and N,N'-bis(3-(triethoxysilyl)propyl)piperazine.

In one embodiment, the bipodal aminosilane is bis(3-(triethoxysilyl)propyl)amine, which has the advantage of releasing ethanol instead of more toxic and less desirable methanol during the polycondensation of the ethoxysilane groups.

The bipodal aminosilane can be a secondary aminosilane. Using a secondary bipodal aminosilane instead of a primary aminosilane decreases the reactivity of the polymeric stabilizer with respect to electrophilic species, in particular aldehydes. Hence, benefit agents containing high levels of aldehydes may be encapsulated with a lower propensity for adverse interactions between core-forming and shell-forming materials.

In one embodiment, the at least one aminosilane comprises a bipodal aminosilane in combination with a further aminosilane. The further aminosilane may be a compound of Formula (I) as defined hereinabove.

The aminosilane to bio-based polymeric surfactant weight ratio may be from 0.1 to 1.1, in particular from 0.2 to 0.9, even more particularly from 0.3 to 0.7, for example 0.5.

Polyfunctional Isocyanate

In one embodiment, the polymeric stabilizer further comprises a polyfunctional isocyanate. Polyfunctional isocyanates are chemical substances containing two or more (e.g. 3, 4, 5, etc.) isocyanate functional groups in the molecule. Polyfunctional isocyanates are commonly used as monomers to make various polymers, such as polyureas and polyurethanes. In the present invention, polyfunctional isocyanate helps to increase the concentration of the bio-based polymeric surfactant at the oil/water interface. The polyfunctional isocyanate acts as a linker between both the aminosilane and the bio-based polymeric surfactant by forming polyurea and polyurethane bonds.

In one embodiment, the polyfunctional isocyanate may be an alkyl, alicyclic, aromatic or alkylaromatic isocyanate, or a combination thereof.

In one embodiment, the polyfunctional isocyanate is an aromatic or an alkylaromatic polyfunctional isocyanate. Optionally, the alkylaromatic polyfunctional isocyanate has methylisocyanate groups attached to an aromatic ring. Both aromatic and methylisocyanate-substituted aromatic polyfunctional isocyanates have superior reactivity compared to alkyl and alicyclic polyfunctional isocyanates.

In one embodiment, the polyfunctional isocyanate is 2-ethylpropane-1,2,3-triyl tris((3-(isocyanatomethyl)phenyl)carbamate). Its tripodal nature favors the formation of intermolecular cross-links and its intermediate reactivity favors network homogeneity. This alkylaromatic polyfunctional isocyanate is commercially available under the trademark Takenate D-100 N, sold by Mitsui or under the trademark Desmodur® Quix175, sold by Covestro.

In a particularly preferred embodiment of the present invention, the polymeric stabilizer is formed by combination of pectin with bis(3-(triethoxysilyl)propyl)amine. Preferably, the polymeric stabilizer is formed by combination of pectin with bis(3-(triethoxysilyl)propyl)amine and 2-ethylpropane-1,2,3-triyl tris((3-(isocyanatomethyl)phenyl)carbamate).

Hydrocolloid

The polymeric stabilizer plays a very important role in the balance between microcapsule stability with respect to both the leakage of the benefit agent during storage and release of the benefit agent under in-use conditions. It is, therefore, important to provide additional stabilization at the oil-water interface, in a sustainable fashion. The polymeric stabilizer provides a stable platform which allows for the addition of further shell materials and/or shell precursors to form novel encapsulated compositions.

Hydrocolloids contain a large number of hydroxyl groups, leading to their high affinity for water molecules. They have been used as wall material in microencapsulation processes both in the food industry and beyond. Most naturally sourced hydrocolloids comprise a number of polysaccharides and certain proteins (e.g. gelatin).

The hydrocolloid may interact with the polymeric stabilizer by physical forces, physical interactions, such as hydrogen bonding, ionic interactions, hydrophobic interactions or electron transfer interactions.

As shown in WO2020/233887 A1, the addition of hydroxyethylcellulose to the shell leads to microcapsules with a good release profile.

Bio-Based and Biodegradable Hydrocolloid Bio-Based and Biodegradable Epoxy Resin Surprisingly, it was found that by using a combination of a bio-based and biodegradable epoxy resin with a bio-based and biodegradable hydrocolloid, the resulting encapsulated composition shows similar or better properties than the encapsulated compositions of the prior art. The properties relate to the encapsulation efficiency of the benefit agent into the microcapsule and to the balance between robustness during storage and benefit agent release profile during use of the encapsulated composition into a consumer product. In addition, the present encapsulated compositions have increased consumer appeal due to the presence of higher percentages of biodegradable carbon containing ingredients. It is, therefore, predicted that the encapsulated compositions of the present invention show improved biodegradability.

Without wishing to be bound by theory, it is believed that the presence of a linker derived from a bio-based and biodegradable epoxy resin in combination with a bio-based and biodegradable hydrocolloid in the microcapsule formulation helps to stabilize the oil/water interface through reducing the amount of residual free (i.e. un-linked) material in the aqueous phase, as evidenced by the data in Table 3.

Use of biodegradable materials is beneficial to the overall biodegradability of the microcapsule. Furthermore, it increases the consumer appeal of the encapsulated composition, which is highly sustainable due to the use of bio-based and biodegradable ingredients.

In one embodiment, the bio-based hydrocolloids are plant or animal-derived hydrocolloids or gelatin from animal-derived collagen.

Suitable plant-derived, biodegradable hydrocolloids may be pectin, modified starches, guar gum, locust bean gum, and konjac mannan, along with exudate gums, such as gum arabic, gum ghatti, and tragacanth, and seaweed-derived hydrocolloids, such as agar, alginates, and carrageenan.

In one embodiment, the bio-based and biodegradable hydrocolloid is selected from the group consisting of pectin, modified starch and gelatin.

In one embodiment, the pectin is sugar-free pectin.

In one embodiment, the modified starch is commercially available under the trademark HiCap 100, sold by Ingredion.

In one embodiment, the gelatin is fish gelatin, such as "fish gelatin Kosher", commercially available from Lapi Gelatine Spa, Societa Uniperso.

The bio-based and biodegradable hydrocolloid may be deposited on the outer surface of the capsule shell formed by the polymeric stabilizer.

The bio-based hydrocolloid may also react with unreacted isocyanate groups and increase the density of the cross-linked shell.

The biodegradability of the microcapsules is significantly related to the origin of the ingredients (i.e. natural vs. synthetic), degree of cross-linking, physical properties (crystallinity, melting point, and degree of ionization) of the polymer chains.

It has been surprisingly found that the presence of a bio-based, biodegradable linker derived from an epoxy resin leads to reinforcing of the shell by covalent or physical bonding, with the bio-based and biodegradable hydrocolloid and/or with the bio-based polymeric surfactant.

Examples of suitable bio-based, biodegradable epoxy resin from which the linker is derived include but are not limited to epoxidized unsaturated oils such as epoxidized soybean oil, epoxidized vegetable oil, and the like; epoxidized alcohols such as isoborbide glycidyl ether, ethylene glycol diglycidyl ether, diethylene glycol diglycidyl ether, polyethylene glycol diglycidyl ether, polypropylene glycol diglycidyl ether, glycerol polyglycidyl ether, diglycerol polyglycidyl ether, polyglycerol polyglycidyl ether, polyglycerol-3-glycidyl ether, trimethylolpropane polyglycidyl ether, neopentyl glycol diglycidyl ether, 1,6-hexanediol diglycidyl ether, pentaerythritol polyglycidyl ether; castor oil glycidyl ether; epoxidized polysaccharides such as sorbitol polyglycidyl ether; epoxidised phenols such as resorcinol diglycidyl ether, hydrogenated bisphenol A diglycidyl ether; diglycidyl terephthalate; diglycidyl o-phthalate; N-glycidyl phthalimide; epoxy cresol novolac resin; hexahydrophthalic acid diglycidyl ester; epoxidised terpenes and the like.

In one embodiment, the bio-based, biodegradable epoxy resin from which the linker is derived is selected from the group consisting of epoxidised plant oils, epoxidised alcohols, epoxidised furans, epoxidised phenols and combinations thereof.

Suitable epoxidised alcohols include epoxidised isosorbide.

Suitable epoxidised phenols include phenols derived from cardanol, triglycidyl phloroglucinol, vanillin and methoxy hydroquinone.

Suitable epoxidised plant oils include linseed oil and soybean oil.

Particularly suitable linseed oils are commercialized by Arkema as Vikoflex® 7190 or by Valtris as Lankroflex™ L.

A particularly suitable soybean oil is commercialized by Arkema as Vikoflex® 7170.

The bio-based, biodegradable linker derived from an epoxy resin may be deposited either on the inner or on the outer surface of the capsule shell formed by the polymeric stabilizer.

Without wishing to be bound by theory, it is believed that when the bio-based, biodegradable linker derived from an epoxy resin is deposited on the outer surface of the capsule shell formed by the polymeric stabilizer, the linker covalently binds to the hydrocolloid. When the bio-based, biodegradable linker derived from an epoxy resin is deposited on the inner surface of the capsule shell formed by the polymeric stabilizer, it is believed that the linker interacts by physical bonds with the bio-based polymeric stabilizer. Both types of interaction, therefore, provide additional stabilization at the oil/water interface.

These interactions result in a multilayer shell having at least one layer of polymeric stabilizer and one layer of bio-based, biodegradable hydrocolloid, with bio-based, biodegradable linker derived from an epoxy resin distributed between these layers. It is believed that such a layer structure improves the imperviousness of the encapsulating shell by increasing the amount of encapsulating material and reducing the amount of free, unlinked hydrocolloid present in the aqueous phase.

In one embodiment, the shell comprises one essentially homogenous layer.

In one embodiment, the shell comprises two or more discrete layers.

In one embodiment, the shell comprises two or more gradual and non-discrete layers.

In one embodiment of the present invention, the shell comprises
  a) a polymeric stabilizer formed by combination of pectin with bis(3-(triethoxysilyl)propyl)amine and, optionally, 2-ethylpropane-1,2,3-triyl tris((3-(isocyanatomethyl)phenyl)carbamate);
  b) pectin; and
  c) epoxidised linseed oil and/or epoxidised soybean oil.

In one embodiment of the present invention, the shell comprises
  a) a polymeric stabilizer formed by combination of pectin with bis(3-(triethoxysilyl)propyl)amine and, optionally, 2-ethylpropane-1,2,3-triyl tris((3-(isocyanatomethyl)phenyl)carbamate);
  b) modified starch; and
  c) epoxidised linseed oil and/or epoxidised soybean oil.

In one embodiment of the present invention, the shell comprises
  a) a polymeric stabilizer formed by combination of pectin with bis(3-(triethoxysilyl)propyl)amine and, optionally, 2-ethylpropane-1,2,3-triyl tris((3-(isocyanatomethyl)phenyl)carbamate);
  b) fish gelatin; and
  c) epoxidised linseed oil and/or epoxidised soybean oil.

This combination of bio-based polymeric surfactant, bipodal aminosilane, biodegradable hydrocolloid and biodegradable linker derived from epoxidised plant oil is not only highly sustainable with high predicted biodegradability, but also provides particularly advantageous interface stability and release properties. The stabilized interface is sufficiently impervious to effectively encapsulate the at least one benefit agent comprised in the core.

In one embodiment, the shell further comprises a second linker derived from a compound selected from the group consisting of an anhydride, such a maleic anhydride, trimellitic anhydride or pyromellitic dianhydride; or an acid, such as 2,5-furan dicarboxylic acid, trimesic acid or trimellitic acid; or a combination thereof. The role of the second linker is to re-inforce the shell against leakage.

In one embodiment, the shell as defined hereinabove is further stabilized with a stabilizing agent. Optionally, the stabilizing agent comprises at least two carboxylic acid groups.

In one embodiment, the stabilizing agent is selected from the group consisting of citric acid, benzene-1,3,5-tricarboxylic acid, 2,5-furandicarboxylic acid, itaconic acid, poly(itaconic acid) and combinations thereof.

In order to offer an optimal balance between stability, deposition on substrate and performance, the volume median size (d50) of the microcapsules can be from 1 to 50 µm, preferably from 5 to 30 µm. Microcapsules having diameters smaller than 5 µm show large surface to volume ratios and are therefore more prone to leaching, whereas, as the number of microcapsule decreases with increasing diameter, too large microcapsules may not be numerous enough to provide noticeable benefits. Furthermore, large microcapsules may be visible in the product or may visibly stain the substrate.

Methods of Preparation

Another aspect of the present invention relates to a method for preparing an encapsulated composition as described herein above. This method comprises the steps of:
  a) Providing an oil phase comprising at least one benefit agent, at least one aminosilane, optionally a polyfunctional isocyanate, and a bio-based and biodegradable epoxy resin;
  b) Providing an aqueous phase;
  c) Emulsifying the oil phase of step a) and the aqueous phase of step b) to form an emulsion of oil droplets in the aqueous phase;
  d) Dissolving or dispersing a bio-based polymeric surfactant and, optionally, a second linker in the emulsion formed in step c);
  e) Dissolving or dispersing a bio-based and biodegradable hydrocollold in the emulsion formed in step d);

and, optionally, wherein a step of adding a stabilizing agent is carried out between step d) and step e) and/or after step e);

f) Causing the at least one aminosilane, the bio-based polymeric surfactant, the bio-based and biodegradable hydrocollolid and the bio-based and biodegradable epoxy resin to form a shell at the oil-water interface of the emulsified oil droplets, thereby forming a slurry of microcapsules.

The at least one benefit agent, at least one aminosilane, bio-based polymeric surfactant, polyfunctional isocyanate, bio-based and biodegradable hydrocollolid, bio-based and biodegradable epoxy resin, second linker and stabilizing agent are as defined hereinabove.

Alternatively, the present invention relates to a method for preparing an encapsulated composition comprising the steps of:

a) Providing an oil phase comprising at least one benefit agent, at least one aminosilane and, optionally a polyfunctional isocyanate;
b) Providing an aqueous phase;
c) Emulsifying the oil phase of step a) and the aqueous phase of step b) to form an emulsion of oil droplets in the aqueous phase;
d) Dissolving or dispersing a bio-based polymeric surfactant and, optionally, a stabilizing agent, in the emulsion formed in step c);
e) Providing a bio-based and biodegradable hydrocollolid;
f) Providing a bio-based and biodegradable epoxy resin, optionally dispersed in a vegetable fatty acid, such as methyl linoleate or miglyol;
g) Dissolving or dispersing the bio-based and biodegradable hydrocollolid provided in step e) and the bio-based and biodegradable epoxy resin provided in step f) in the emulsion formed in step d), wherein
  (i) the dissolving or dispersing of the bio-based and biodegradable hydrocollolid provided in step e) is carried out before or after the dissolving or dispersing of the bio-based and biodegradable epoxy resin provided in step f); or
  (ii) the bio-based and biodegradable hydrocollolid provided in step e) and the bio-based and biodegradable epoxy resin provided in step f) are mixed together before dissolving or dispersing in the emulsion formed in step d);
h) optionally, adding a stabilizing agent to the emulsion formed in step g); and
i) Causing the at least one aminosilane, the bio-based polymeric surfactant, the bio-based and biodegradable hydrocollolid and the bio-based and biodegradable epoxy resin to form a shell 20) at the oil-water interface of the emulsified oil droplets, thereby forming a slurry of microcapsules.

The at least one benefit agent, at least one aminosilane, bio-based polymeric surfactant, polyfunctional isocyanate, bio-based and biodegradable hydrocollolid, bio-based and biodegradable epoxy resin, second linker and stabilizing agent are as defined hereinabove.

The vegetable fatty acid is optionally provided in step f) in order to disperse the bio-based and biodegradable epoxy resin prior to addition into an aqueous medium.

In one embodiment, step a) further comprises dissolving or dispersing a bio-based and biodegradable epoxy resin. This portion of epoxy resin is in addition to the epoxy resin provided in step f).

Oil-in-water emulsions have the advantage of providing a plurality of droplets that may be used as template for shell formation, wherein the shell is built around each of these droplets.

Additionally, the droplet size distribution may be controlled in emulsions, by controlling the conditions of emulsifications, such as stirring speed and stirrer geometry. As a result, a plurality of microcapsules is obtained with controlled average size and size distribution, wherein the oil phase is encapsulated and forms thereby the core of the microcapsules.

The temperature is preferably maintained at about 25° C. for at least 1 h, then progressively increased to at least about least 80° C., but not more than about 100° C., for example 85° C., 90° C. or 95° C., before progressively decreasing the temperature to about 25° C. Under these conditions, the formation of the shell is well controlled, meaning optimal stabilization of the interface is obtained.

The appropriate stirring speed and geometry of the mixer can be selected in order to obtain the desired average droplet size and droplet size distribution. It is a characteristic of the present invention that the polymeric stabilizer has sufficient interfacial activity and is able to promote the formation of dispersed oil droplets with desirable droplet size.

In a process according to the present invention, a one-liter vessel equipped with a turbine, or a cross-beam stirrer with pitched beam, such as a Mig stirrer, and having a stirrer diameter to reactor diameter of 0.6 to 0.8 may be used. Microcapsules formed in such reactor may have a volume median size (d50) of 30 microns or less, at a stirring speed from about 100 to about 1200 rpm. The person skilled in the art will understand that such stirring conditions may change depending on the size of the reactor and of the batch size, on the exact geometry of the stirrer on the ratio of the diameter of the stirrer to the diameter of the reactor diameter ratios.

After formation of the microcapsules, the encapsulated composition is usually cooled to room temperature. Before, during or after cooling, the encapsulated composition may be further processed. Further processing may include treatment of the composition with anti-microbial preservatives, which preservatives are well known in the art. Further processing may also include the addition of a suspending aid, such as a hydrocolloid suspending aid to assist in the stable physical dispersion of the microcapsules and prevent any creaming or coalescence. Any additional adjuvants conventional in the art may also be added during further-processing.

The method according to the present invention may comprise the additional step of drying the microcapsules, in order to obtain a microcapsule power.

Optionally, additional materials may be added to this powder. Suitable additional materials are, for example, carrier materials, such as salts, silicates, clays and carbohydrates, fire proofing materials; functional materials, such as fragrance ingredients, cosmetic ingredients, biologically active ingredients, and substrate enhancers; additional encapsulating materials, such as polysaccharides, proteins, alkoxysilanes, synthetic polymers and copolymers, surfactants and waxes.

Drying methods such as spray-drying, spray-coating, belt and drum drying may be employed. These methods are well known to the art.

In particular, the drying process may be accompanied by an additional encapsulation process, wherein a functional material is entrapped in an additional encapsulating material. For example, the slurry to be dried may comprise, additionally to the core-shell microcapsules obtained in the process according to the present invention, at least one non-encapsulated functional material and at least one water-soluble encapsulating material, so that the functional material, that is not encapsulated in the core-shell microcapsule, is entrapped in the water-soluble encapsulating material during drying. Typically, the at least one water-soluble encapsulating material comprises at least one hydrocolloid, such as starch octenyl succinate and gum acacia. The hydrocolloid promotes and stabilizes the dispersion of the non-encapsulated material in the aqueous phase of the slurry, so that, upon drying, a matrix is formed around or coexisting with the core-shell microcapsules.

The benefit agent that is encapsulated in the core-shell microcapsules may comprise a first fragrance, whereas the functional material entrapped in the water-soluble encapsulating material may comprise a second fragrance, wherein the first and second fragrances are identical or different.

Combining at least two encapsulation processes has the advantage of providing different mechanisms for releasing the benefit agent and the functional material, for example a combination of moisture-induced and mechanical stress-induced releases.

The drying step may also be accompanied or followed by mechanical or thermal treatment, such as spheronization, granulation and extrusion.

In accordance with the process of the present invention, if desired, core-shell microcapsules may be further coated with a functional coating. A functional coating may entirely or only partially coat the microcapsule shell. Regardless whether the functional coating is charged or uncharged, its primary purpose is to alter the surface properties of the microcapsule to achieve a desirable effect, such as to enhance the deposition of the microcapsule on a treated surface, such as a fabric, human skin or hair. Functional coatings may be post-coated to already formed microcapsules, or they may be physically incorporated into the microcapsule shell during shell formation. They may be attached to the shell by physical forces, physical interactions, such as hydrogen bonding, ionic interactions, hydrophobic interactions, electron transfer interactions, or they may be covalently bonded to the shell.

The encapsulated composition may be in the form of liquid slurries, powder, granulates, flakes or extrudates. The composition may be used as such, for example as fragrance booster, or in diluted form in a product.

Encapsulated compositions in the form of liquid slurries may comprise from 10% to 50%, more particularly from 15% to 25%, of core-shell microcapsules.

Encapsulated compositions in solid form may comprise from 1 to 100% of core-shell microcapsules. However, depending on the application or on the nature of the functional material, it may be preferable to limit or, on the contrary, to maximize the level of core-shell microcapsules in the solid form. For example, a limitation of the level of the core-shell microcapsules in the solid may be particularly desired if the encapsulated material is flammable, reactive, pungent or expensive.

Hence, the optimal level of encapsulated fragrance ingredients in a solid composition may be less than 50%, more particularly less than 35% and still more particularly less than 20%, or even less than 15%, depending on the flammability of such fragrance ingredients and the associated explosion risks.

The encapsulated fragrance may be diluted in a carrier material mentioned herein above.

Consumer Product

The present invention also relates to a consumer product comprising an encapsulated composition as described hereinabove. The consumer product may be selected from the group consisting of household (home) care, personal care, fabric care and pet care products.

Suitable home care products include hard surface cleaners, heavy duty detergents and detergent powders, air care compositions.

Suitable personal care products include cleansing compositions (such as shampoos, bath and shower gels, liquid soaps, soap bars), conditioning compositions (such as hair care conditioners), bath and shower lotions, oral care compositions, deodorant compositions, antiperspirant compositions, skin care products Suitable fabric care compositions include laundry care detergents, laundry care conditioners, fabric refreshers, scent boosters.

Encapsulated compositions according to the present invention are particularly useful when employed as perfume delivery vehicles in consumer goods that require, for delivering optimal perfumery benefits, that the microcapsules adhere well to a substrate on which they are applied. Such consumer goods include hair shampoos and conditioners, as well as textile-treatment products, such as laundry detergents and conditioners.

The encapsulated composition of the present invention, presented in the form of a slurry of microcapsules suspended in an aqueous suspending medium may be incorporated as such in a consumer product base. If desired, however, the slurry may be dried to present the encapsulated composition in dry powder form. Drying of a slurry of microcapsules is conventional, and may be carried out according techniques known in the art, such as spray-drying, evaporation, lyophilization or use of a desiccant. Typically, as is conventional in the art, dried microcapsules will be dispersed or suspended in a suitable powder, such as powdered silica, which can act as a bulking agent or flow aid. Such suitable powder may be added to the encapsulated composition before, during or after the drying step.

Yet another aspect of the present invention relates to the use of an encapsulated composition as described hereinabove to improve the perception or enhance the performance of the benefit agent in a consumer product.

The present invention is further illustrated by means of the following non-limiting examples:

EXAMPLES

Trimesic acid=benzene-1,3,5-tricarboxylic acid
Trimellitic acid=benzene-1,2,4-tricarboxylic acid
Pyromellitic dianhydride=1H,3H-Benzo[1,2-c:4,5-c']difuran-1,3,5,7-tetrone
Miglyol=a propylene glycol diester of C8-C10 saturated vegetable fatty acids The solid content of each of the slurries was measured by using a thermobalance operating at 120° C. The solid content, expressed as weight percentage of the initial slurry deposited on the balance was taken at the point where the drying-induced rate of weight change had dropped below 0.1%/min. The ratio of the measured solid content to the theoretical solid content calculated based on the weight of perfume and encapsulating materials involved is taken as a measurement of encapsulation yield, expressed in %.

The solid content of the slurry obtained, the volume median size (d50) of the capsules (measured by Laser Diffraction) and the encapsulation efficiency of the slurries obtained are shown in Table 1.

The amount of residual bio-based polymer in the aqueous phase was measured using SEC MALS. The capsules slurry were processed in order to obtain a clear filtrate, either by filtration under 9 bar nitrogen pressure over a membrane filter (pore size 1.2 μm), or by centrifugation at 4500 rmp during 45 minutes. The obtained clear filtrate was filtered again over a 0.45 μm syringe filter and used directly for analysis. 100 μl of this solution were injected into a SEC-MALS system consisting of a Waters Alliance HPLC chain, three columns, tempered at 30° C. and covering molecular mass range from 1000-5 000 000 g/mol (Waters Hydrogel series), a multiangle (8) light scattering detector (Wyatt Dawn 8+) and a differential refraction index detector (Wyatt Optilab T-rex). The eluent was prepared by filtering an aqueous solution of $NaNO_3$ (0.3 mol/l) and $NaN_3$ (0.02 mass %) over a 0.02 μm filter. The flow rate of 0.3 ml/min was applied at a pressure of 250-300 psi. Data acquisition and treatment was performed using ASTRA v7 and polymer dn/dc value of 0.1850 l/g for gelatin, 0.1450 l/g for pectin and saccharose, 0.2145 l/g for trimesic acid.

The perfume leakage in the base was detected by GC-MS. 300 mg capsules were weighed in a 30 ml flask. Methyl decanoate (internal standard) 50 μl at 100 000 ppm was added in Methanol (5 mg), followed by addition of 30 ml Ethanol. The mixture was placed in an ultrasonic bath for 10 minutes. Samples were injected in GC/FID (split) and compared to the corresponding perfume.

Example 1: Formation of Reference Microcapsules Comprising 2-Hydroxyethyl Cellulose (HEC) and No Linker Derived From an Epoxy Resin (Reference)

Capsules comprising HEC and no linker derived from an epoxy resin were obtained according to Example 5.5 of WO2020/233887 A1.

Example 2: Formation of Microcapsules with Addition of Epoxidised Linseed Oil in the Perfume Phase; Hi Cap 100 as a Constituent of the Shell The microcapsules have been obtained by performing the steps of:
a) Preparing a core composition by admixing 385 g of fragrance composition, 6.7 g of bipodal aminosilane (bis(3-triethoxysilylpropyl)amine) and 4.8 g of polyisocyanate adduct prepolymer (Takenate D-110 from Mitsui Chemicals). Setting the stirring speed at 250 RPM at a temperature of 25° C. for 5 min, then adding 10 g of Vikoflex 7190. Waiting for 40 min under stirring.
b) Emulsifying the core composition obtained in step a) in 661.8 g of tap water by using a 1 L reactor and a MIG blade at a stirring speed of 550 RPM at a temperature of 25° C. for 5 min;
c) Adding 13.5 g of high methoxylated pectin (of grade APA 104, ex Roeper), increasing progressively the temperature to 45° C. over 30 min;
d) Adding 3 g of trimesic acid and maintaining the temperature at 45° C. for 1 h;
e) Increasing progressively the temperature to 55° C. over 15 min, maintaining the temperature at 55° C. for 1 h and increasing progressively the temperature to 70° C. over about 22 min;
f) Adding 3 g of trimesic acid at 70° C. and increasing the temperature to 85° C. for 23 min;
g) Adding 23.14 g of starch Hi Cap 100 at 85° C. and maintaining the temperature at 85° C. for 1 h 30 min;
h) Decreasing progressively the temperature to 25° C. over 3 h.

Example 3: Formation of Microcapsules with Addition of Epoxidised Linseed Oil in the Perfume Phase; Hi Cap 100 and Maleic Anhydride as a Constituent of the Shell The microcapsules have been obtained by performing the steps of:
a) Preparing a core composition by admixing 385 g of fragrance composition, 6.7 g of bipodal aminosilane (bis(3-triethoxysilylpropyl)amine) and 4.8 g of polyisocyanate adduct prepolymer (Takenate D-110 from Mitsui Chemicals). Setting the stirring speed at 250 RPM at a temperature of 25° C. for 5 min, then adding 10 g of Vikoflex 7190. Waiting for 40 min under stirring.
b) Emulsifying the core composition obtained in step a) in 661.8 g of tap water by using a 1 L reactor and a MIG blade at a stirring speed of 500 RPM at a temperature of 25° C. for 5 min;
c) Adding 13.5 g of high methoxylated pectin (of grade APA 104, ex Roeper), increasing progressively the temperature to 45° C. over 30 min;
d) Adding 5 g of maleic anhydride and increasing the pH with 21 g of a 10% NaOH solutions; maintaining the temperature at 45° C. for 1 h;
e) Increasing progressively the temperature to 55° C. over 15 min, maintaining the temperature at 55° C. for 1 h and increasing progressively the temperature to 85° C. over about 45 min;
f) Adding 17.79 g of Starch Hi Cap 100 at 85° C. and maintaining the temperature at 85° C. for 1 h;
g) Adding 3 g of trimesic acid and maintaining the temperature at 85° C. for 30 min;
h) Decreasing progressively the temperature to 25° C. over 3 h.

Example 4: Formation of Microcapsules with Addition of Epoxidised Linseed Oil in the Perfume Phase; Hi Cap 100 and Trimellitic Anhydride as a Constituent of the Shell The microcapsules have been obtained by performing the same steps as in Example 3, except that the maleic anhydride (5 g) is replaced with trimellitic anhydride (7 g).

Example 5: Formation of Microcapsules with Addition of Epoxidised Linseed Oil in the Perfume Phase; Hi Cap 100 and Pyromellitic Dianhydride as a Constituent of the Shell The microcapsules have been obtained by performing the same steps as in Example 3, except that the maleic anhydride (5 g) is replaced with pyromellitic dianhydride (0.7 g).

Example 6: Formation of Microcapsules with Addition of Epoxidised Linseed Oil in the Perfume Phase; Gelatin as a Constituent of the Shell The microcapsules have been obtained by performing the steps of:
a) Preparing a core composition by admixing 385 g of fragrance composition, 6 g of bipodal aminosilane (bis(3-triethoxysilylpropyl)amine) and 4.28 g of polyisocyanate adduct prepolymer (Takenate D-110 from Mitsui Chemicals). Setting the stirring speed at 250 RPM at a temperature of 25° C. for 10 min, then adding 10 g of Lankroflex L. Waiting for 30 min under stirring.
b) Emulsifying the core composition obtained in step a) in 661.8 g of tap water by using a 1 L reactor and a MIG blade at a stirring speed of 800 RPM at a temperature of 25° C. for 5 min;
c) Adding 10 g of high methoxylated pectin (of grade APA 104, ex Roeper), increasing progressively the temperature to 45° C. over 30 min;
d) Maintaining the temperature at 45° C. for 1 h;
e) Increasing progressively the temperature to 55° C. over 15 min, maintaining the temperature at 55° C. for 1 h and increasing progressively the temperature to 70° C. over about 22 min;
f) Adding 3 g of trimesic acid at 70° C. and increasing the temperature to 85° C. for 23 min and maintaining the temperature at 85° C. for 1 h 30 min;
g) Decreasing progressively the temperature to 40° C. over 2 h 15 min. Adding 100 g of a 10% fish gelatin solution in water, that has been stirred for 1 h at 40° C. prior to addition.
h) Decreasing progressively the temperature to 10° C. over 2 h 15 min and maintaining the temperature at 10° C. for 1 h
i) Increasing the temperature to 20° C. over 2 h and maintaining it at 20° C. overnight.

Example 7: Formation of Microcapsules with Addition of Epoxidised Linseed Oil in the Perfume Phase; Gelatin and Maleic Anhydride as a Constituent of the Shell The microcapsules have been obtained by performing the steps of:
a) Preparing a core composition by admixing 385 g of fragrance composition, 6 g of bipodal aminosilane (bis(3-triethoxysilylpropyl)amine) and 4.28 g of polyisocyanate adduct prepolymer (Takenate D-110 NB from Mitsui Chemicals). Setting the stirring speed at 250 RPM at a temperature of 25° C. for 10 min, then adding 15 g of Lankroflex L. Waiting for 30 min under stirring.
b) Emulsifying the core composition obtained in step a) in 661.8 g of tap water by using a 1 L reactor and a MIG blade at a stirring speed of 800 RPM at a temperature of 25° C. for 5 min;
c) Adding 10 g of high methoxylated pectin (of grade APA 104, ex Roeper), increasing progressively the temperature to 45° C. over 30 min;
d) Maintaining the temperature at 45° C. for 1 h;
e) Increasing progressively the temperature to 55° C. over 15 min, maintaining the temperature at 55° C. for 1 h and increasing progressively the temperature to 70° C. over about 22 min;
f) Adding 2 g of maleic anhydride at 70° C.
g) Adjusting the pH to 3.7 with a 30% NaOH solution and adding 3 g of trimesic acid at 70° C.
h) Increasing the temperature to 95° C. for 37 min and maintaining the temperature at 95° C. for 1 h 30 min;
i) Decreasing progressively the temperature to 40° C. over 2 h 15 min. Adding 100 g of a 10% fish gelatin solution in water, that has been stirred for 1 h at 40° C. prior to addition.
j) Decreasing progressively the temperature to 10° C. over 2 h 15 min and maintaining the temperature at 10° C. for 1 h
k) Increasing the temperature to 20° C. over 2 h and maintaining it at 20° C. overnight.

Example 8: Formation of Microcapsules with Addition of Epoxidised Linseed Oil in the Perfume Phase; Gelatin and Trimellitic Anhydride as a Constituent of the Shell The microcapsules have been obtained by performing the same steps as in Example 7, except that the maleic anhydride (2 g) is replaced with trimellitic anhydride (3 g).

Example 9: Formation of Microcapsules with Addition of Epoxidised Soybean Oil in the Aqeous Phase; Hi Cap 100 as a Constituent of the Shell The microcapsules have been obtained by performing the steps of:
a) Preparing a core composition by admixing 385 g of fragrance composition, 6.7 g of bipodal aminosilane (bis(3-triethoxysilylpropyl)amine) and 4.8 g of polyisocyanate adduct prepolymer (Takenate D-110 from Mitsui Chemicals). Setting the stirring speed at 250 RPM at a temperature of 25° C. for 40 min.
b) Emulsifying the core composition obtained in step a) in 661.8 g of acidified tap water (HCl 10%, pH=2.4) by using a 1 L reactor and a MIG blade at a stirring speed of 900 RPM at a temperature of 25° C. for 5 min;
c) Adding 13.5 g of high methoxylated pectin (of grade APA 104, ex Roeper), increasing progressively the temperature to 45° C. over 30 min and maintaining the temperature at 45° C. for 1 h;
d) Adding 23.1 g of starch (Hi Cap 100 from Ingredion) and maintaining the temperature at 45° C. for 1 h. Increasing progressively the temperature to 55° C. over 15 min;
e) Re-ajusting the pH of the mixture to 2.4 with HCl 10%, then adding 1.3 g of epoxidised soybean oil (Vikoflex 7170 from Arkema). Maintaining the temperature at 55° C. for 1 h and increasing progressively the temperature to 85° C. over 45 min;
f) Adding 3 g of trimesic acid and maintaining the temperature at 85° C. for 1 h 30 min;
g) Decreasing progressively the temperature to 25° C. over 3 h.

Example 10: Formation of Microcapsules with Addition of Epoxidised Soybean Oil in the Aqeous Phase; Hi Cap 100 as a Constituent of the Shell The microcapsules have been obtained by performing the steps of:
a) Preparing a mixture by adding 23.1 g of starch (Hi Cap 100 from Ingredion), 15 g of epoxidised soybean oil (Vikoflex 7170 from Arkema) and 20 g of methyl linoleate. Stirring and heating the mixture at 40° C. for 5 h;
b) Preparing a core composition by admixing 385 g of fragrance composition, 6.7 g of bipodal aminosilane (bis(3-triethoxysilylpropyl)amine) and 4.8 g of polyisocyanate adduct prepolymer (Takenate D-110 from Mitsui Chemicals). Setting the stirring speed at 250 RPM at a temperature of 25° C. for 40 min.

c) Emulsifying the core composition obtained in step b) in 661.8 g of tap water by using a 1 L reactor and a MIG blade at a stirring speed of 550 RPM at a temperature of 25° C. for 5 min;
d) Adding 13.5 g of high methoxylated pectin (of grade APA 104, ex Roeper), increasing progressively the temperature to 45° C. over 30 min;
e) Adding 3 g of trimesic acid and maintaining the temperature at 45° C. for 2 h. Increasing progressively the temperature to 55° C. over 15 min and maintaining the temperature at 55° C. for 1 h;
f) Adding the mixture obtained in step a) and increasing progressively the temperature to 70° C. over 23 min;
g) Adding 3 g of trimesic acid increasing progressively the temperature to 85° C. over 22 min and maintaining the temperature at 85° C. for 1 h 30 min;
h) Decreasing progressively the temperature to 25° C. over 3 h.

Example 11: Formation of Microcapsules with Addition of Epoxidised Soybean Oil in the Aqeous Phase; Pectin as a Constituent of the Shell The microcapsules have been obtained by performing the steps of:
a) Preparing a mixture by adding 10 g of pectin without saccharose, 15 g of epoxidised soybean oil (Vikoflex 7170 from Arkema) and 20 g of methyl linoleate. Stirring and heating the mixture at 40° C. for 5 h;
b) Preparing a core composition by admixing 385 g of fragrance composition, 6.7 g of bipodal aminosilane (bis(3-triethoxysilylpropyl)amine) and 4.8 g of polyisocyanate adduct prepolymer (Takenate D-110 from Mitsui Chemicals). Setting the stirring speed at 250 RPM at a temperature of 25° C. for 40 min.
c) Emulsifying the core composition obtained in step b) in 661.8 g of tap water by using a 1 L reactor and a MIG blade at a stirring speed of 550 RPM at a temperature of 25° C. for 5 min;
d) Adding 13.5 g of high methoxylated pectin (of grade APA 104, ex Roeper), increasing progressively the temperature to 45° C. over 30 min;
e) Adding 3 g of trimesic acid and maintaining the temperature at 45° C. for 2 h. Increasing progressively the temperature to 55° C. over 15 min and maintaining the temperature at 55° C. for 1 h;
f) Adding the mixture obtained in step a) and increasing progressively the temperature to 70° C. over 23 min;
g) Adding 3 g of trimesic acid increasing progressively the temperature to 85° C. over 22 min and maintaining the temperature at 85° C. for 1 h 30 min;
h) Decreasing progressively the temperature to 25° C. over 3 h.

Example 12: Formation of Microcapsules with Addition of Epoxidised Linseed Oil in the Perfume Phase and Epoxidised Soybean Oil in the Ageous Phase; Hi Cap 100 as a Constituent of the Shell The microcapsules have been obtained by performing the steps of:
a) Preparing a mixture by adding 5 g of starch (Hi Cap 100 from Ingredion), 1 g of epoxidised soybean oil (Vikoflex 7170 from Arkema) and 5 g of methyl linoleate. Stirring and heating the mixture at 40° C. for 5 h;
b) Preparing a core composition by admixing 385 g of fragrance composition, 6.7 g of bipodal aminosilane (bis(3-triethoxysilylpropyl)amine) and 3.6 g of polyisocyanate adduct prepolymer (Takenate D-110 from Mitsui Chemicals). Setting the stirring speed at 250 RPM at a temperature of 25° C. for 10 min. Adding 10 g of epoxidised linseed oil (Vikoflex 7190 from Arkema) and maintaining the stirring and the temperature for 30 min.
c) Emulsifying the core composition obtained in step b) in 661.8 g of tap water by using a 1 L reactor and a MIG blade at a stirring speed of 500 RPM at a temperature of 25° C. for 5 min;
d) Adding 13.5 g of high methoxylated pectin (of grade APA 104, ex Roeper), increasing progressively the temperature to 45° C. over 30 min;
e) Adding 3 g of trimesic acid and maintaining the temperature at 45° C. for 2 h. Increasing progressively the temperature to 55° C. over 15 min and maintaining the temperature at 55° C. for 1 h;
f) Adding the mixture obtained in step a) and increasing progressively the temperature to 70° C. over 23 min;
g) Adding 3 g of trimesic acid increasing progressively the temperature to 95° C. over 37 min;
h) Adding 18.1 g of starch (Hi Cap 100, Ingredion) and maintaining the temperature at 95° C. for 1 h 30 min;
i) Decreasing progressively the temperature to 25° C. over 3 h 30 min.

Example 13: Comparison of Physical Properties of the Microcapsules of the Invention vs Microcapsules of the Prior Art (Reference)

Table 1 shows a comparison between the proportion of biodegradable carbon containing ingredients in the shell of the microcapsules of Examples 1-12. These values reflect the expected biodegradability of the shells of the microcapsules.

TABLE 1

Biodegradable carbon containing components of the shell (wt. %) in Examples 1-12

| Example | % biodegradable carbon containing components of the shell[a] |
|---|---|
| 1* | 27.60 |
| 2 | 75.6 |
| 3 | 76.30 |
| 4 | 78.00 |
| 5 | 79.00 |
| 6 | 76.00 |
| 7 | 72.00 |
| 8 | 70.14 |
| 9 | 70.88 |
| 10 | 81.00 |
| 11 | 66.50 |
| 12 | 76.00 |

*for reference;
[a] it was considered that the biodegradability of HiCap 100 starch, gelatin and pectin is 100% and the biodegradability of the epoxy resin and of the maleic anhydride, trimellitic anhydride and pyromellitic dianhydride is 80% over 60 days The microcapsules of Examples 2 to 12 employ significantly higher amounts of biodegradable carbon containing components than the reference microcapsules of Example 1.

The measured solid content of the slurry, the volume median size (d50) of the capsules and the encapsulation efficiency was measured for the capsules of Examples 1-12. The results are shown in Table 2.

TABLE 2

Values of the measured solid content of the slurry, volume median size (d50) of the capsules and encapsulation efficiency for Examples 1 to 12

| Example | solid content of the slurry (% w/w) | volume median size (d50) of the capsules (μm) | encapsulation efficiency (%) |
|---|---|---|---|
| 1* | 40.0 | 20.0 | 95 |
| 2 | 40.6 | 20.2 | 100 |
| 3 | 39.0 | 20.5 | 99 |
| 4 | 40.82 | 21.3 | 100 |
| 5 | 39.75 | 17.9 | 99 |
| 6 | 33.7 | 29.2 | 98 |
| 7 | 34.6 | 25.4 | 100 |
| 8 | 33.27 | 24.8 | 96 |
| 9 | 37.3 | 22.6 | 94 |
| 10 | 36.2 | 16.7 | 91 |
| 11 | 34.5 | 19.3 | 88 |
| 12 | 38.8 | 18.4 | 96 |

*reference

The microcapsule size in all examples is within the preferred range of 5 to 30 μm.

It can be observed that the encapsulation efficiency of the capsules comprising bio-based linker derived from an epoxy resin in combination with bio-based hydrocolloid (Examples 2 to 12) matches the encapsulation efficiency of the reference microcapsules comprising HEC (Example 1).

Example 14—Comparison of the Amount of Residual (Un-Bound) Bio-Based Polymer in the Aqueous Phase The amount of residual bio-based polymer in the aqueous phase was measured using SEC MALS for selected microcapsules of Examples 1-12 and is shown in Table 3.

TABLE 3

Amount of residual bio-based polymer in the aqueous phase

| Example | Bio-Based Hydrocolloid and Cross Linker (where present) | Amount of Residual Bio-Based Polymer in The Aqueous Phase |
|---|---|---|
| 1* | HEC | >80% |
| 2 | cross linker + HiCap 100 starch | 59.2% |
| 5 | cross linker + HiCap 100 starch | >50% |
| 6 | cross linker + fish gelatin | 37.7% |
| 9 | cross linker + HiCap 100 starch | 39.8% |
| 10 | cross linker + HiCap 100 starch | 25.8% |
| 11 | cross linker + pectin | 70.7% |
| 12 | cross linker + HiCap 100 starch | 35.8% |

*reference

It is clear that employing a combination of bio-based polymeric surfactant, bio-based hydrocolloid and bio-based cross-linker leads to decreased amounts of residual (un-bound) polymer in the aqueous phase, which means that the shell formation is more efficient than when the shell contains only bio-based polymeric surfactant and HEC (Example 1).

Example 15—Comparison of Olfactive Performance

The olfactive performance of the microcapsules was assessed by a panel of 4 experts who rated the odor intensity on a linear scale of 1-5 (with indicative values of 1=barely noticeable, 2=weak, 3=medium, 4=strong and 5=very strong). When relevant, qualitative comments on the perceived odor direction were recorded.

For application in laundry care, the samples were evaluated in an unperfumed commercial proprietary fabric care softener. The aforementioned microcapsule slurries were added to a fabric care conditioner composition under gentle stirring with a paddle mixer, so that the level of slurry in the fabric care conditioner base was 0.9% referred to the total weight of the fabric care softener base. 35 g of fabric care conditioner was put in a front-loaded wash machine containing 720 g of terry toweling and operating with a total volume of 15 l water. The "out-of-the-wash machine" odor intensity was assessed on wet toweling within 5 min after having removed the toweling from the machine. The pre-rub olfactive evaluation was performed after drying the toweling for 24 h at room temperature. The post-rub evaluation was performed by gently rubbing one part of the toweling. The performance on terry toweling of freshly prepared and aged microcapsules is shown in Table 4.

TABLE 4

Olfactive performance on terry toweling of selected microcapsules comprising bio-based linker derived from an epoxy resin in combination with bio-based hydrocolloid compared to microcapsules comprising HEC

| Example | Intensity on wet | Pre-rub intensity on dry | Post-rub intensity on dry |
|---|---|---|---|
| 1* | 1.5 | 2.3 | 4.6 |
| 2 | 1.5 | 2.0 | 4.6 |
| 3 | 1.4 | 1.5 | 3.7 |
| 4 | 2.0 | 2.0 | 2.8 |
| 7 | 2.0 | 1.3 | 3.6 |
| 10 | 2.4 | 1.3 | 3.5 |
| 11 | 2.7 | 1.5 | 3.5 |

*reference

The results show that microcapsules according to the present invention provide perfume performance that is comparable to the performance of the reference microcapsules using HEC (Example 1).

Example 16—Comparison of Fragrance Release Performance (Leakage)

The release performance of the microcapsule slurries was measured in the following conditions. The slurry was diluted and incorporated in liquid softener base (0.2% of fragrance in base). The base was an unperfumed commercial proprietary laundry care conditioner base.

For each assessment, 1% of slurry was dispersed in the base under stirring with a paddle mixer. The samples were stored in a 37° C. oven for 1 month. The perfume leakage in the base was calculated by a GC-MS analysis. The results are shown in Table 5.

TABLE 5

The release performance of selected microcapsules after 1 month

| Example | Perfume leakage (%) |
|---|---|
| 1* | 24 |
| 2 | <20 |
| 3 | <20 |
| 4 | 12 |
| 7 | <20 |

TABLE 5-continued

The release performance of selected microcapsules after 1 month

| Example | Perfume leakage (%) |
|---------|---------------------|
| 9       | <20                 |
| 10      | <30                 |
| 11      | <20                 |

*reference

It can be observed that the microcapsules of Example 4 are outstanding from the point of view of stability over time, with only 12% leakage observed after 1 month, whereas the microcapsules of Examples 2, 3, 7, 9 and 11 showed less than 20% leakage observed after 1 month at 37° C. This level of stability is better than that observed for the reference capsules of the prior art (Example 1). The capsules of Example 10 performed similarly to the reference capsules employing HEC.

The invention claimed is:

1. An encapsulated composition comprising at least one core-shell microcapsule, wherein the at least one core-shell microcapsule comprises a core comprising at least one benefit agent and a shell surrounding the core, wherein the shell comprises:
   a) a polymeric stabilizer that is formed by combination of a bio-based polymeric surfactant with at least one aminosilane resulting in an assembly which comprises moieties derived from the polymeric surfactant and moieties derived from the at least one aminosilane;
   b) a bio-based and biodegradable hydrocollolid; and
   c) a linker derived from a bio-based and biodegradable epoxy resin;
      wherein the bio-based polymeric surfactant comprises a polysaccharide comprising carboxylic acid groups, wherein the carboxylic acid groups comprise uronic acid units;
      wherein the bio-based and biodegradable hydrocolloids are plant and seaweed-derived hydrocolloids or gelatin;
      wherein the bio-based and biodegradable epoxy resin is selected from the group consisting of epoxidised plant oils, epoxidised alcohols, epoxidised furans, epoxidised phenols and combinations thereof; and
      wherein the linker derived from an epoxy resin interacts by covalent or physical bonding with the bio-based and biodegradable hydrocolloid and/or with the bio-based polymeric surfactant.

2. The encapsulated composition according to claim 1, wherein the benefit agent is selected from the group consisting of pectin.

3. The encapsulated composition according to claim 1, wherein the bio-based polymeric surfactant is a high methoxylated pectin or gum acacia Senegal.

4. The encapsulated composition according to claim 1, wherein the at least one aminosilane is a bipodal aminosilane.

5. The encapsulated composition according to claim 1, wherein the polymeric stabilizer further comprises a polyfunctional isocyanate.

6. The encapsulated composition according to claim 1, wherein the bio-based and biodegradable hydrocolloid is selected from the group consisting of polysaccharides; and combinations thereof, optionally wherein the bio-based and biodegradable hydrocollolid is a pectin, a modified starch, a gelatin or a combination thereof.

7. The encapsulated composition according to claim 1, wherein the bio-based and biodegradable epoxy resin is an epoxidised plant oil.

8. The encapsulated composition according to claim 1, wherein the shell is further stabilized with a stabilizing agent, optionally wherein the stabilizing agent comprises at least two carboxylic acid groups.

9. The encapsulated composition according to claim 1, wherein the shell further comprises a second linker derived from a compound selected from the group consisting of an anhydride an acid, and a combination thereof.

10. The encapsulated composition according to claim 6, wherein the polysaccharide is a pectin, modified starches, guar gum, locust bean gum, konjac mannan, gum arabic, gum ghatti, tragacanth, agar, alginates, carrageenan or a combination thereof.

11. The encapsulated composition according to claim 6, wherein the protein is gelatin.

12. A method for preparing an encapsulated composition according to claim 1, the method comprising the steps of:
   a) Providing an oil phase comprising at least one benefit agent, at least one aminosilane, optionally a polyfunctional isocyanate, and a bio-based and biodegradable epoxy resin;
   b) Providing an aqueous phase;
   c) Emulsifying the oil phase of step a) and the aqueous phase of step b) to form an emulsion of oil droplets in the aqueous phase;
   d) Dissolving or dispersing a bio-based polymeric surfactant and, optionally, a second linker in the emulsion formed in step c);
   e) Dissolving or dispersing a bio-based and biodegradable hydrocollolid in the emulsion formed in step d);
   and, optionally, wherein a step of adding a stabilizing agent is carried out between step d) and step e) and/or after step e);
   f) Causing the at least one aminosilane, the bio-based polymeric surfactant, the bio-based and biodegradable hydrocolloid and the bio-based and biodegradable epoxy resin to form a shell at the oil-water interface of the emulsified oil droplets, thereby forming a slurry of microcapsules.

13. A method for preparing an encapsulated composition according to claim 1, the method comprising the steps of:
   a) Providing an oil phase comprising at least one benefit agent, at least one aminosilane and, optionally a polyfunctional isocyanate;
   b) Providing an aqueous phase;
   c) Emulsifying the oil phase of step a) and the aqueous phase of step b) to form an emulsion of oil droplets in the aqueous phase;
   d) Dissolving or dispersing a bio-based polymeric surfactant and, optionally, a stabilizing agent, in the emulsion formed in step c);
   e) Providing a bio-based and biodegradable hydrocollolid;
   f) Providing a bio-based and biodegradable epoxy resin, optionally dispersed in a vegetable fatty acid;
   g) Dissolving or dispersing the bio-based and biodegradable hydrocolloid provided in step e) and the bio-based and biodegradable epoxy resin provided in step f) in the emulsion formed in step d), wherein
      (i) the dissolving or dispersing of the bio-based and biodegradable hydrocollolid provided in step e) is carried out before or after the dissolving or dispersing of the bio-based and biodegradable epoxy resin provided in step f); or (ii) the bio-based and biodegradable hydrocolloid provided in step e) and the bio-based and biodegradable epoxy resin provided in step f) are mixed together before dissolving or dispersing in the emulsion formed in step d);

h) optionally, adding a stabilizing agent to the emulsion formed in step g); and i) Causing the at least one aminosilane, the bio-based polymeric surfactant, the bio-based and biodegradable hydrocollolid and the bio-based and biodegradable epoxy resin to form a shell at the oil-water interface of the emulsified oil droplets, thereby forming a slurry of microcapsules.

14. The method according to claim 13, further comprising dissolving or dispersing a bio-based and biodegradable epoxy resin in the oil phase of step a).

15. A consumer product comprising an encapsulated composition according to claim 1.

16. A consumer product according to claim 15, wherein the consumer product is selected from the group consisting of personal care product, fabric care product, home care product or a pet care product.

17. A method of improving the perception or enhancing the performance of a benefit agent in a consumer product, the method comprises adding the encapsulated composition of claim 1 to the consumer product.

* * * * *